United States Patent
Kikkawa et al.

(10) Patent No.: US 10,190,683 B2
(45) Date of Patent: Jan. 29, 2019

(54) CONTROL DEVICE AND CONTROL METHOD FOR CONTINUOUSLY VARIABLE TRANSMISSION

(71) Applicant: AISIN AW CO., LTD., Anjo-shi, Aichi-ken (JP)

(72) Inventors: Akihiro Kikkawa, Anjo (JP); Masaki Ueda, Kariya (JP); Masachika Kato, Anjo (JP); Kiyoshi Kurita, Anjo (JP); Hiroshi Tsutsui, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 440 days.

(21) Appl. No.: 14/912,749

(22) PCT Filed: Sep. 25, 2014

(86) PCT No.: PCT/JP2014/075471
§ 371 (c)(1),
(2) Date: Feb. 18, 2016

(87) PCT Pub. No.: WO2015/046353
PCT Pub. Date: Apr. 2, 2015

(65) Prior Publication Data
US 2016/0201798 A1    Jul. 14, 2016

(30) Foreign Application Priority Data

Sep. 27, 2013 (JP) .................. 2013-201655
Mar. 10, 2014 (JP) .................. 2014-046868

(51) Int. Cl.
*F16H 61/66* (2006.01)
*F16H 61/662* (2006.01)
*F16H 61/02* (2006.01)

(52) U.S. Cl.
CPC ...... *F16H 61/662* (2013.01); *F16H 2061/022* (2013.01); *F16H 2061/6615* (2013.01); *F16H 2061/66204* (2013.01)

(58) Field of Classification Search
CPC ................................................ F16H 61/66231
See application file for complete search history.

(56) References Cited

U.S. PATENT DOCUMENTS 7,548,810 B2 * 6/2009 Aoki ................. F16H 61/66259
477/34
2005/0096822 A1    5/2005 Aoki
(Continued)

FOREIGN PATENT DOCUMENTS

JP    2001-330125 A    11/2001
JP    2002-364744 A    12/2002
(Continued)

OTHER PUBLICATIONS

Oct. 28, 2014 Search Report issued in International Patent Application No. PCT/JP2014/075471.
(Continued)

*Primary Examiner* — Derek D Knight
(74) *Attorney, Agent, or Firm* — Oliff PLC

(57) ABSTRACT

A control device for a continuously variable transmission that steplessly changes a speed ratio of the continuously variable transmission mounted on a vehicle, the control device including a controller that changes the speed ratio such that a stepwise upshift is performed, wherein in the case where an accelerator depression amount is constant, the controller increases a number of allowable stepwise upshifts as the accelerator depression amount is larger.

20 Claims, 13 Drawing Sheets

(56) References Cited

U.S. PATENT DOCUMENTS

2008/0287256 A1    11/2008   Unno
2012/0136548 A1     5/2012   Hoff

FOREIGN PATENT DOCUMENTS

| JP | 2005-140174 A | 6/2005 |
| JP | 2008-291988 A | 12/2008 |
| JP | 2008-309229 A | 12/2008 |
| JP | 2010-007749 A | 1/2010 |
| JP | 2013-200003 A | 10/2013 |

OTHER PUBLICATIONS

Apr. 24, 2017 Supplementary Search Report issued in European Patent Application No. 14848665.7.

* cited by examiner

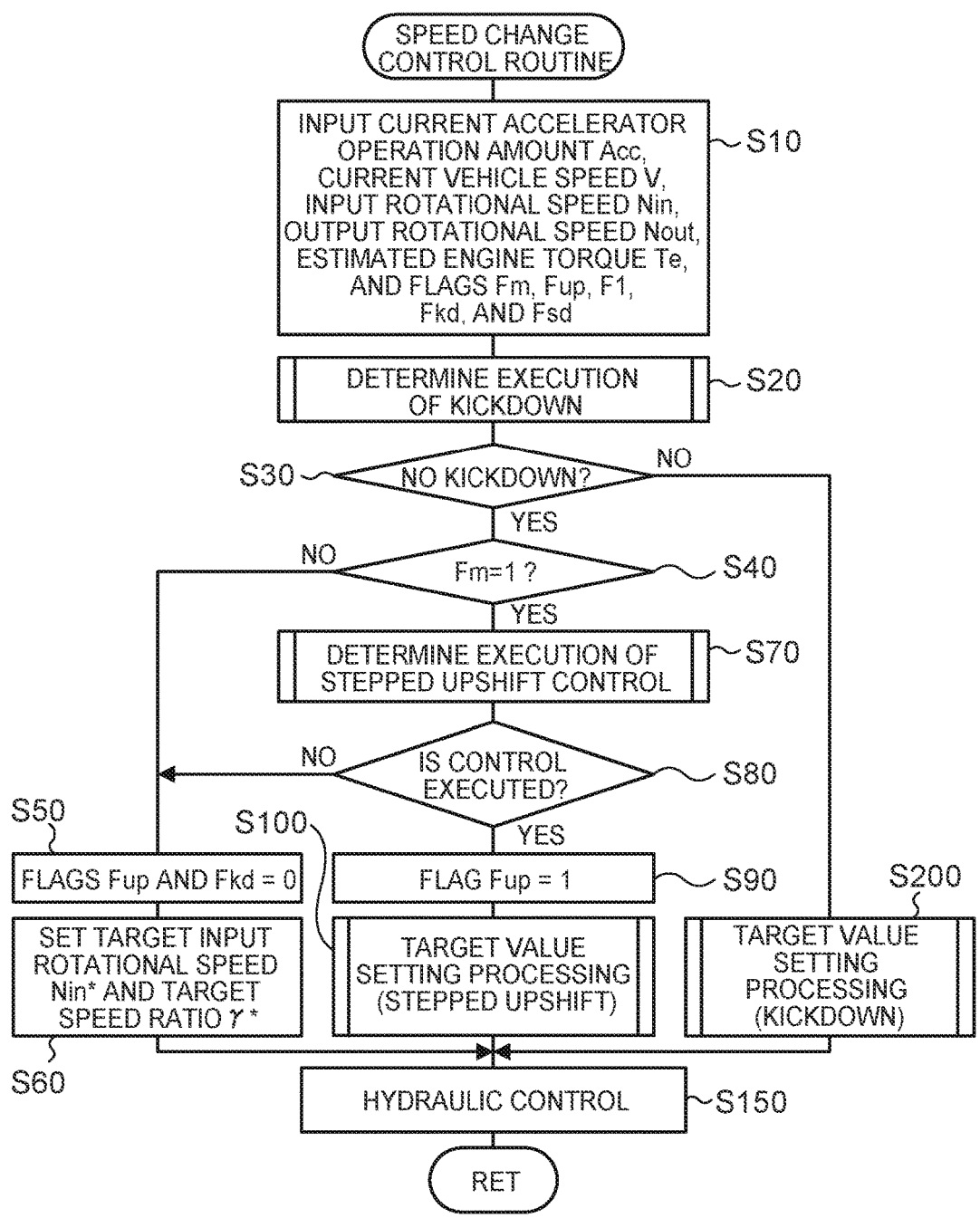

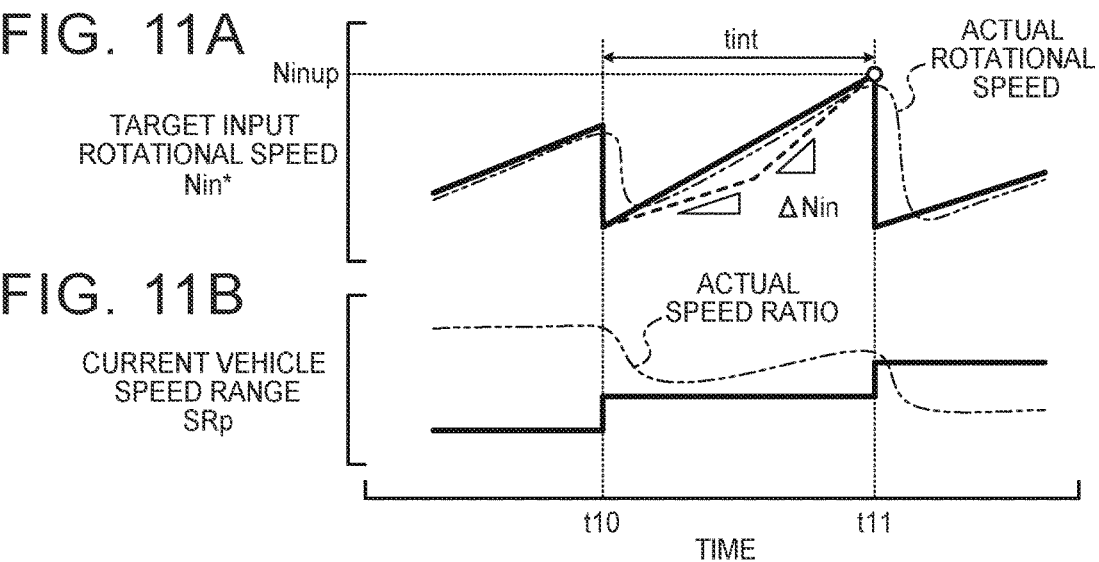

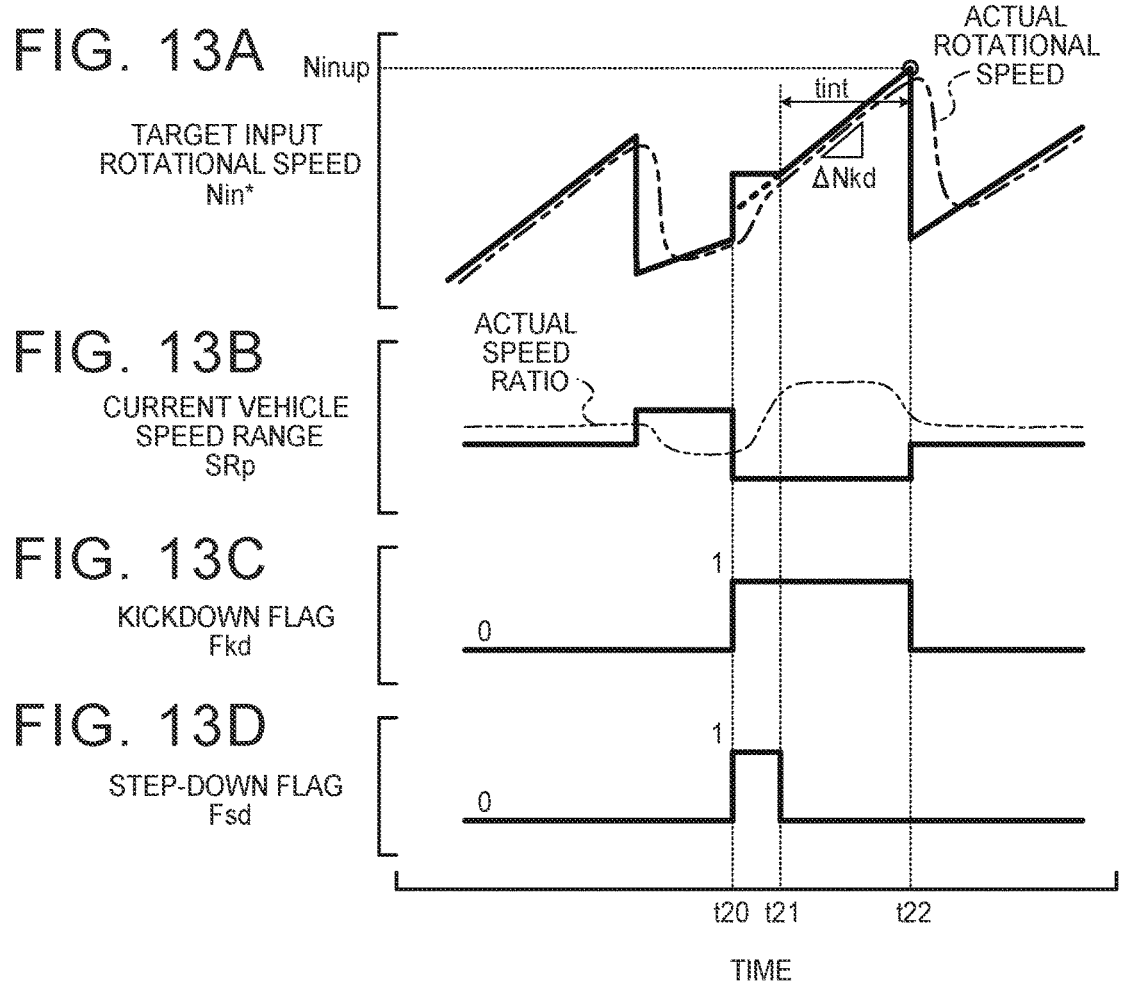

CONTROL DEVICE AND CONTROL METHOD FOR CONTINUOUSLY VARIABLE TRANSMISSION

BACKGROUND

The present disclosure relates to a control device and a control method for a continuously variable transmission mounted on a vehicle.

There has hitherto been known a control device for a continuously variable transmission that can steplessly vary output rotation of a drive source, the control device changing the continuously variable transmission stepwise (in a stepped manner) among a plurality of shift speeds set in advance (see Japanese Patent Application Publication No. 2008-309229, for example). When an automatic speed change mode is set, the control device changes the speed ratio of the continuously variable transmission stepwise from a first speed to a seventh speed using seven groups of speed ratio lines, namely a group of first speed ratio lines (first speed group) to a group of seventh speed ratio lines (seventh speed group), each group including three speed ratio lines with different speed change characteristics.

There has also been known a control device for a continuously variable transmission, which selects one of a normal speed change mode and a pseudo stepped upshift mode in accordance with the magnitude of an acceleration request from a driver, and which controls the speed ratio of the continuously variable transmission on the basis of the selected mode (see Japanese Patent Application Publication No. 2010-007749, for example). When the pseudo stepped upshift mode is selected to control the speed ratio, the control device judges that an acceleration request from a driver is provided in the case where the operation speed of a throttle valve is equal to or more than a predetermined threshold, and performs an upshift at predetermined time intervals or at time intervals set to be short in the case where at least one of the vehicle speed and the operation amount of the throttle valve is small. Consequently, an upshift is performed at a lower engine rotational speed as the magnitude of the acceleration request from the driver is small, and a travel state in which the engine rotational speed rises in conjunction with a rise in vehicle speed occurs repeatedly.

There has additionally been known a control device for a continuously variable transmission, in which a target input rotational speed for the continuously variable transmission is varied stepwise to perform a stepwise upshift when the target input rotational speed reaches an upshift determination value and perform a stepwise downshift in accordance with an increase in accelerator operation amount (see Japanese Patent Application Publication No. 2013-200003, for example). The control device calculates the target input rotational speed by adding a vehicle speed correction value, which is set to become larger as the vehicle speed becomes higher, and an accelerator operation amount correction value, which is set to become larger as the accelerator operation amount becomes larger, to a base rotational speed that serves as a reference. In order to vary the target input rotational speed stepwise, in addition, the control device updates the value of the base rotational speed at a particular timing using the accelerator operation amount which varies stepwise in calculating the accelerator operation amount correction value.

SUMMARY

With the control device described in Japanese Patent Application Publication No. 2008-309229, the continuously variable transmission can be caused to operate similarly to a seven-speed automatic transmission. Just by causing the continuously variable transmission to operate similarly to a stepped automatic transmission, however, the drivability of a vehicle on which the continuously variable transmission is mounted is not necessarily improved. Thus, the control device for a continuously variable transmission according to the related art still has room for improvement in terms of improving the drivability of a vehicle. With the disclosure described in Japanese Patent Application Publication No. 2010-007749, meanwhile, the interval of execution of the stepwise upshift becomes shorter if the operation amount of the throttle valve becomes smaller when the vehicle is accelerating. Thus, fluctuations in engine sound may not match the intention of acceleration of the driver, which may incur a so-called sense of busyness (sense of discomfort). Further, in the case where the target input rotational speed is set as with the control device described in Japanese Patent Application Publication No. 2013-200003 when the speed ratio of the continuously variable transmission is varied stepwise, the degree of contribution of the accelerator operation amount correction value to variations in target input rotational speed is smaller if the accelerator operation amount (accelerator depression amount) is generally constant, and the degree of contribution of the vehicle speed correction value to variations in target input rotational speed is smaller if the vehicle speed is converged (the acceleration is lowered) with an accelerator pedal depressed. Thus, with the control device described in Japanese Patent Application Publication No. 2013-200003, it is difficult to provide a good acceleration feel by setting the target input rotational speed so as to match the intention of acceleration of the driver when the speed ratio of the continuously variable transmission is varied stepwise unless the base rotational speed is set adequately. However, Japanese Patent Application Publication No. 2013-200003 does not disclose a procedure for setting the base rotational speed at all. Thus, the control device described in Japanese Patent Application Publication No. 2013-200003 still has room for improvement in terms of improving the drivability of a vehicle on which a continuously variable transmission is mounted.

In view of the foregoing, an exemplary aspect of the present disclosure improves the drivability of a vehicle on which a continuously variable transmission is mounted.

The present disclosure according to an exemplary aspect provides a control device for a continuously variable transmission that steplessly changes a speed ratio of the continuously variable transmission mounted on a vehicle, the control device including a controller that changes the speed ratio such that a stepwise upshift is performed, wherein in the case where an accelerator depression amount is constant, the controller increases a number of allowable stepwise upshifts as the accelerator depression amount is larger.

The control device steplessly changes the speed ratio of a continuously variable transmission mounted on a vehicle, and executes a stepwise change in speed ratio, that is, a stepwise upshift. The control device increases the number of change steps of the speed ratio, which corresponds to the number of shift speeds of a stepped transmission, that is, the number of allowable stepwise upshifts, as the accelerator depression amount is larger in the case where the accelerator depression amount is constant. In this way, the vehicle acceleration and the engine sound of the vehicle can be adequately varied in accordance with the intention of acceleration of the driver by increasing the number of allowable stepwise upshifts as the accelerator depression amount achieved by the driver of the vehicle is larger in the case where the accelerator depression amount is constant. Thus, the drivability of a vehicle on which a continuously variable transmission is mounted can be improved.

In addition, the controller may make a shifting-to-shifting time, which is a time between the stepwise upshifts, shorter as the accelerator depression amount is larger. In this way, by making the shifting interval time, that is, the execution interval between stepwise upshifts, shorter as the accelerator depression amount is larger, an atmospheric acceleration feel, that is, a sense of rhythm, to be felt by the driver can be improved by rhythmically varying the engine sound of the vehicle in the case where the accelerator depression amount is large and the intention of acceleration of the driver is high. As a result, it is possible to further improve the drivability of a vehicle on which a continuously variable transmission is mounted by improving the sense of rhythm obtained when stepwise upshifts are made in the case where the accelerator depression amount is large and the intention of acceleration of the driver is high.

Further, the controller may make a shifting-to-shifting time, which is a time between the stepwise upshifts, longer as a number of executions of the stepwise upshift is increased when the vehicle is accelerating. That is, if the vehicle speed becomes higher with the vehicle accelerating in response to an accelerator operation, the intention of acceleration of the driver becomes gradually lower even if the accelerator operation is performed, and the driver may be given a sense of discomfort if the execution interval between stepwise upshifts is made shorter in such a state. If the shifting-to-shifting time is made longer as the number of executions of stepwise upshifts is increased when the vehicle is accelerating, that is, if the execution interval between stepwise upshifts is made longer as the number of times of execution of stepwise upshifts during acceleration is increased, in contrast, fluctuations in engine sound can be made more adequate so as to match the intention of acceleration of the driver. Consequently, it is possible to suppress impairment of the sense of rhythm, that is, occurrence of the so-called sense of busyness, during acceleration of the vehicle. Thus, it is possible to further improve the drivability of a vehicle on which a continuously variable transmission is mounted by improving the sense of rhythm obtained when stepwise upshifts are made.

In addition, the controller may change the speed ratio such that a shifting interval time, which is a time between the stepwise upshifts, is made shorter and a rate of variation in vehicle acceleration during the shifting interval time has a larger value as the accelerator depression amount is larger.

In this way, by making the shifting interval time, that is, the execution interval between stepwise upshifts, shorter as the accelerator depression amount is larger, an atmospheric acceleration feel, that is, a sense of rhythm, to be felt by the driver can be improved by rhythmically varying the engine sound of the vehicle in the case where the accelerator depression amount is large and the intention of acceleration of the driver is high. The inventors found that if the rate of variation (gradient) in vehicle acceleration during a period from the start of stepwise changes in speed ratio of the continuously variable transmission (from execution of stepwise upshifts) until a time that allowed humans to perceive variations in vehicle acceleration (e.g. about 0.6 to 2.5 seconds) elapsed was set to a large value, that is, a non-negative value or a value that is close to zero (flat), it was possible to allow the driver to reliably perceive that the vehicle was accelerating during the period to improve the sense that (direct) acceleration that matched his/her accelerator operation was obtained, that is, the sense of directness. Thus, if the shortest shifting interval time (the shortest execution interval between stepwise upshifts), among all the shifting interval times, is set to the time that allows humans to perceive variations in vehicle acceleration discussed above, by setting the rate of variation in vehicle acceleration during the shifting interval time to a larger value as the accelerator depression amount is larger, it is possible to improve the sense of directness by allowing the driver to reliably perceive that the vehicle is accelerating between the timings to change the speed ratio in the case where the accelerator depression amount is large and the intention of acceleration of the driver is high. As a result, with the control device, it is possible to further improve the drivability of the vehicle by improving the sense of rhythm and the sense of directness obtained when the speed ratio of the continuously variable transmission is changed stepwise (stepwise upshifts are made) in the case where the accelerator depression amount is large and the intention of acceleration of the driver is high.

Further, the controller may change the speed ratio such that a shifting interval time, which is a time between the stepwise upshifts, is made longer and a rate of variation in vehicle acceleration during the shifting interval time has a smaller value as a vehicle speed of the vehicle is higher. In this way, by making the shifting interval time, that is, the execution interval between stepwise upshifts, longer as the vehicle speed of the vehicle is higher, it is possible to suppress impairment of the sense of rhythm, that is, occurrence of the so-called sense of busyness, by suppressing frequent fluctuations in engine sound of the vehicle in the case where the vehicle speed of the vehicle is high and the intention of acceleration of the driver is low. Then, by setting the rate of variation in vehicle acceleration during the shifting interval time to a smaller value as the vehicle speed of the vehicle is higher, it is possible to allow the driver to feel that (smooth) acceleration that matches his/her accelerator operation has been obtained in the case where the vehicle speed is high and the intention of acceleration of the driver is low. As a result, with the control device, it is possible to further improve the drivability of the vehicle by optimizing the sense of rhythm and the sense of directness obtained when the speed ratio of the continuously variable transmission is changed stepwise (stepwise upshifts are made) in the case where the vehicle speed is high and the intention of acceleration of the driver is low.

In addition, the controller may change the speed ratio such that an amount of variation in vehicle acceleration between before and after the stepwise upshift is smaller as a vehicle speed of the vehicle is higher. In this way, by making the amount of variation in vehicle acceleration between before and after a stepwise upshift smaller (smaller in absolute value) as the vehicle speed of the vehicle is higher, it is possible to optimize the sense of directness by allowing the driver to feel that (smooth) acceleration that matches his/her accelerator operation has been obtained in the case where the vehicle speed is high and the intention of acceleration of the driver is low.

Further, the controller may change the speed ratio such that an amount of variation in vehicle acceleration between before and after the stepwise upshift is larger as the accelerator depression amount is larger and the vehicle speed of the vehicle is lower. In this way, by making the amount of variation in vehicle acceleration between before and after a stepwise upshift larger (larger in absolute value) as the accelerator depression amount is larger and the vehicle speed is lower, an atmospheric acceleration feel, that is, a sense of rhythm, to be felt by the driver because of fluctuations in vehicle acceleration can be further improved in the case where the accelerator depression amount is large, the vehicle speed is low, and the intention of acceleration of the driver is higher.

In addition, the number of allowable stepwise upshifts at a time when the accelerator depression amount is maximum may be determined to be a value within a range of 12 steps to 48 steps, more preferably within a range of 16 to 36 steps.

Further, the number of allowable stepwise upshifts during a period during which the vehicle speed is increased from zero to a maximum vehicle speed at the time when the accelerator depression amount is maximum may be determined on the basis of a time that allows humans to perceive variations in vehicle acceleration and the time during which the vehicle speed is increased from zero to the maximum vehicle speed. Consequently, it is possible to determine the maximum value (maximum number of steps) of the number of allowable upshifts to be made in the continuously variable transmission within an adequate range that may improve the drivability of the vehicle by achieving both the sense of rhythm and the sense of directness in accordance with the performance of the vehicle (such as the maximum vehicle speed and acceleration performance), the characteristics of the engine, and so forth.

In addition, the control device may further include a mode select switch that allows a driver to select one of a continuously variable speed change mode, in which the speed ratio is changed steplessly, and a stepped speed change mode, in which the speed ratio is changed stepwise, and the speed ratio may be changed such that the stepwise upshift is performed when the stepped speed change mode is selected by the driver. Consequently, it is possible to improve the drivability of the vehicle by making a stepwise upshift in the stepped speed change mode, and to improve the fuel efficiency of the vehicle by steplessly changing the speed ratio in the continuously variable speed change mode.

The present disclosure according to an exemplary aspect provides a control method for a continuously variable transmission that steplessly changes a speed ratio of a continuously variable transmission mounted on a vehicle, the method including: changing the speed ratio such that a stepwise upshift is performed, wherein changing the speed ratio includes increasing a number of allowable stepwise upshifts as the accelerator depression amount is larger in the case where an accelerator depression amount is constant.

With the method, it is possible to adequately vary the vehicle acceleration and the engine sound of the vehicle in accordance with the intention of acceleration of the driver. Thus, it is possible to improve the drivability of a vehicle on which a continuously variable transmission is mounted.

The present disclosure according to an exemplary aspect also provides a control device for a continuously variable transmission that steplessly changes a speed ratio of the continuously variable transmission mounted on a vehicle, the control device including: a controller that changes the speed ratio such that a stepwise upshift is performed, wherein the controller makes a shifting-to-shifting time, which is a time between stepwise upshifts, shorter as an accelerator depression amount is larger.

The control device steplessly changes the speed ratio of a continuously variable transmission mounted on a vehicle, and executes a stepwise change in speed ratio, that is, a stepwise upshift. The control device makes the shifting-to-shifting time, which is the time between the stepwise upshifts, shorter as the accelerator depression amount is larger. In this way, by making the shifting interval time, that is, the interval between stepwise upshifts, shorter as the accelerator depression amount is larger, an atmospheric acceleration feel, that is, a sense of rhythm, to be felt by the driver can be improved by rhythmically varying the engine sound of the vehicle in the case where the accelerator depression amount is large and the intention of acceleration of the driver is high. As a result, it is possible to improve the drivability of a vehicle on which a continuously variable transmission is mounted by improving the sense of rhythm obtained when stepwise upshifts are made in the case where the accelerator depression amount is large and the intention of acceleration of the driver is high.

The present disclosure according to an exemplary aspect also provides a control method for a continuously variable transmission that steplessly changes a speed ratio of a continuously variable transmission mounted on a vehicle, the method including: changing the speed ratio such that a stepwise upshift is performed, the changing of the speed ratio includes making a shifting-to-shifting time, which is a time between the stepwise upshifts, shorter as an accelerator depression amount is larger.

With the method, it is possible to improve the drivability of a vehicle on which a continuously variable transmission is mounted by improving the sense of rhythm obtained when stepwise upshifts are made in the case where the accelerator depression amount is large and the intention of acceleration of the driver is high.

The present disclosure according to an exemplary aspect further provides a control device for a continuously variable transmission that steplessly changes a speed ratio of the continuously variable transmission mounted on a vehicle, the controller including: a controller that changes the speed ratio such that a stepwise upshift is performed, wherein the controller makes a shifting-to-shifting time, which is a time between stepwise upshifts, longer as a number of executions of the stepwise upshift is increased when the vehicle is accelerating.

The control device steplessly changes the speed ratio of a continuously variable transmission mounted on a vehicle, and executes a stepwise change in speed ratio, that is, a stepwise upshift. The control device makes the shifting-to-shifting time, which is the time between the stepwise upshifts, longer as the number of executions of the stepwise upshift is increased when the vehicle is accelerating. That is, if the vehicle speed becomes higher with the vehicle accelerating in response to an accelerator operation, the intention of acceleration of the driver becomes gradually lower even if the accelerator operation is performed, and the driver may be given a sense of discomfort if the execution interval between stepwise upshifts is made shorter in such a state. Thus, if the shifting-to-shifting time is made longer as the number of executions of stepwise upshifts is increased when the vehicle is accelerating, that is, if the execution interval between stepwise upshifts is made longer as the number of executions of stepwise upshifts during acceleration is increased, fluctuations in engine sound can be made more adequate so as to match the intention of acceleration of the driver. Consequently, it is possible to suppress impairment of the sense of rhythm, that is, occurrence of the so-called sense of busyness, during acceleration of the vehicle. Thus, it is possible to further improve the drivability of a vehicle on which a continuously variable transmission is mounted by improving the sense of rhythm obtained when stepwise upshifts are made.

The present disclosure according to an exemplary aspect further provides a control method for a continuously variable transmission that steplessly changes a speed ratio of a continuously variable transmission mounted on a vehicle, the method including: changing the speed ratio such that a stepwise upshift is performed, the changing of the speed ration includes making a shifting-to-shifting time, which is a time between the stepwise upshifts, longer as a number of executions of the stepwise upshift is increased when the vehicle is accelerating.

With the method, it is possible to make fluctuations in engine sound during acceleration of the vehicle more adequate so as to match the intention of acceleration of the driver, and to suppress impairment of the sense of rhythm, that is, occurrence of the so-called sense of busyness, during acceleration of the vehicle. Thus, it is possible to further improve the drivability of a vehicle on which a continuously variable transmission is mounted by improving the sense of rhythm obtained when stepwise upshifts are made.

BRIEF DESCRIPTION OF THE DRAWINGS

FIG. 7 is a flowchart illustrating an example of a speed change control routine executed by a control device for a continuously variable transmission according to a second embodiment of the present disclosure.

FIGS. 11A and 11B are each a time chart illustrating another example of how the target input rotational speed and the current vehicle speed range vary, respectively, when a stepped upshift is executed.

FIGS. 13A, 13B, 13C, and 13D are each a time chart illustrating an example of how the target input rotational speed, the current vehicle speed range, and the values of a kickdown flag and a step-down flag vary, respectively, when a kickdown is executed.

DETAILED DESCRIPTION OF EMBODIMENTS

Now, an embodiment of the present disclosure will be described with reference to the drawings.

Figure 1:
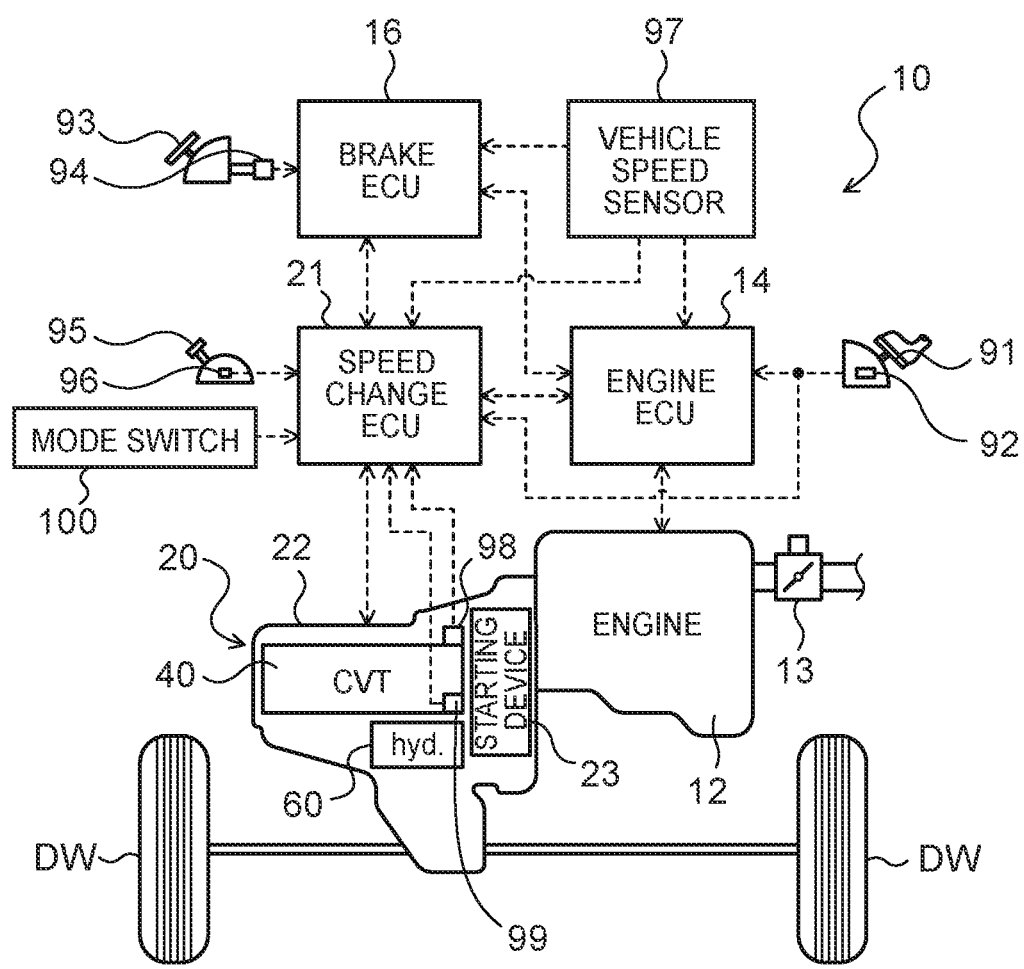
FIG. 1 illustrates a schematic configuration of a vehicle incorporating a power transmission device including a control device for a continuously variable transmission according to the present disclosure.

FIG. 1 illustrates a schematic configuration of an automobile 10 incorporating a power transmission device 20 including a control device for a continuously variable transmission according to the present disclosure. In addition to the power transmission device 20, the automobile 10 illustrated in the drawing includes: an engine (internal combustion engine) 12 that serves as a motor that outputs power through explosive combustion of a mixture of a hydrocarbon fuel, such as gasoline and light oil, and air; an engine electronic control unit (hereinafter referred to as an "engine ECU") 14 that controls the engine 12; a brake electronic control unit (hereinafter referred to as a "brake ECU") 16 that controls an electronically controlled hydraulic brake unit (not illustrated); and so forth.

The engine ECU 14 is structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the engine ECU 14 receives inputs such as an accelerator operation amount (accelerator depression amount) from an accelerator pedal position sensor 92 that detects the amount of depression (amount of operation) of an accelerator pedal 91, a vehicle speed from a vehicle speed sensor 97, signals from various sensors such as a crankshaft position sensor (not illustrated) that detects the rotational position of the crankshaft, and signals from other electronic control units such as the brake ECU 16. The engine ECU 14 controls an electronically controlled throttle valve 13, a fuel injection valve and an ignition plug (not illustrated), and so forth on the basis of the received signals.

The brake ECU 16 is also structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the brake ECU 16 receives inputs such as a master cylinder pressure detected by a master cylinder pressure sensor 94 when a brake pedal 93 is depressed, the vehicle speed from the vehicle speed sensor 97, signals from various sensors (not illustrated), and signals from other electronic control units such as the engine ECU 14. The brake ECU 16 controls a brake actuator (hydraulic actuator) (not illustrated) etc. on the basis of the received signals.

Figure 2:
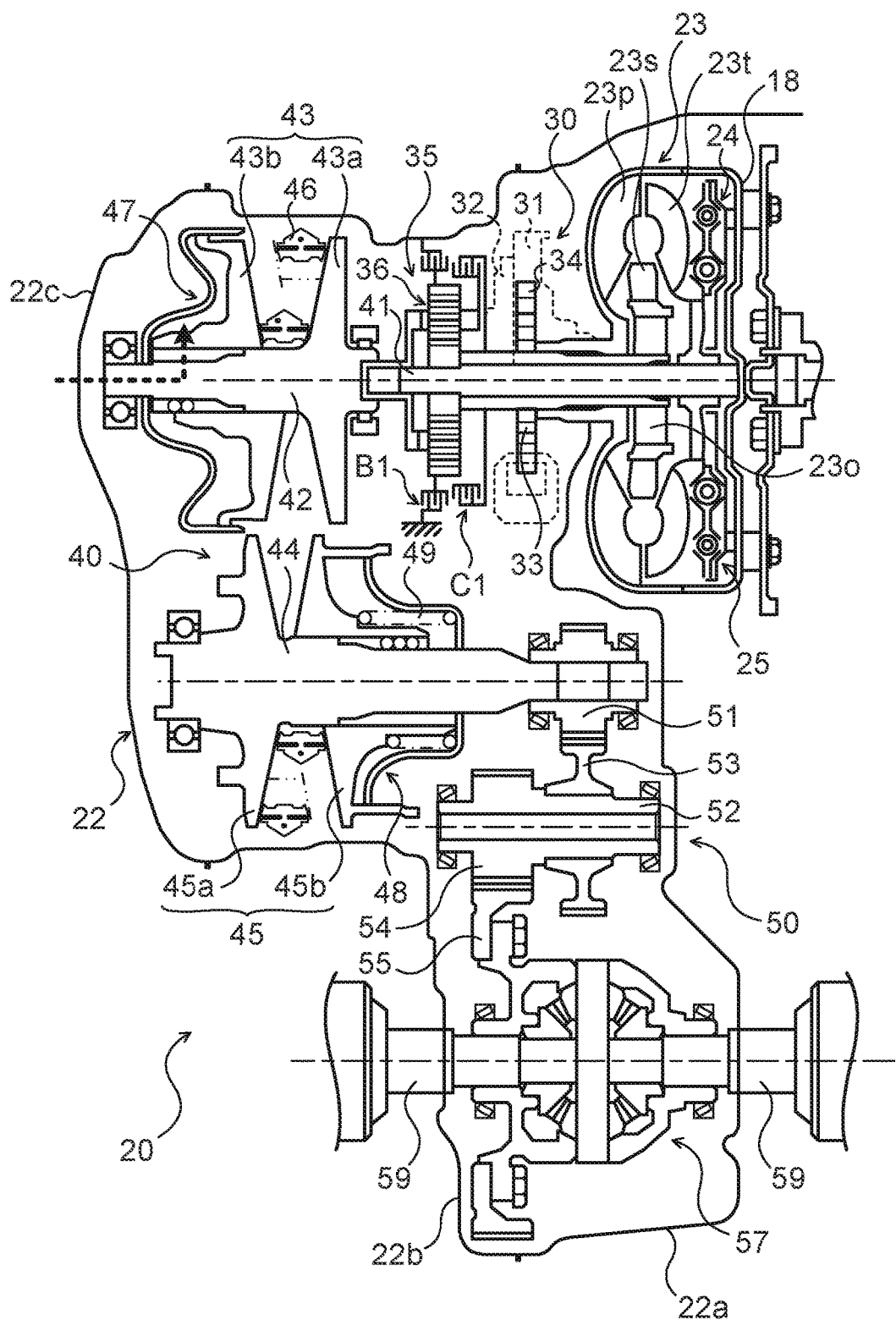
FIG. 2 illustrates a schematic configuration of the power transmission device illustrated in FIG. 1.

FIG. 2 illustrates a schematic configuration of the power transmission device 20 mounted on the automobile 10 according to the embodiment. The power transmission device 20 illustrated in the drawing is constituted as a transaxle connected to the engine 12 disposed transversely such that the crankshaft and left and right drive shafts 59, which are connected to drive wheels DW, are generally parallel to each other. As illustrated in the drawing, the power transmission device 20 includes a transmission case 22 composed of a converter housing 22a, a transaxle case 22b, and a rear cover 22c integrally coupled to each other, a starting device 23 housed inside the transmission case 22, an oil pump 30, a forward/reverse switching mechanism 35, a continuously variable transmission (hereinafter referred to as a "CVT" as appropriate) 40 of a belt type, a gear mechanism 50, a differential gear (differential mechanism) 57, a hydraulic control device 60 (see FIG. 1), a speed change electronic control unit (hereinafter referred to as a "speed change ECU") 21 that serves as a control device that controls the starting device 23 and the CVT 40, and so forth.

The starting device 23 is constituted as a fluidic starting device with a lock-up clutch, and housed inside the converter housing 22a. As illustrated in FIG. 2, the starting device 23 includes a pump impeller 23p connected to the crankshaft of the engine 12 via a front cover 18 that serves as an input member, a turbine runner 23t fixed to an input shaft 41 of the CVT 40, a stator 23s disposed inside the pump impeller 23p and the turbine runner 23t to rectify the flow of working oil (ATF) from the turbine runner 23t to the pump impeller 23p, a one-way clutch 23o that restricts rotation of the stator 23s to one direction, a damper mechanism 24, a lock-up clutch 25, and so forth.

The pump impeller 23p, the turbine runner 23t, and the stator 23s function as a torque converter through the action of the stator 23s when the rotational speed difference between the pump impeller 23p and the turbine runner 23t is large, and function as a fluid coupling when the rotational speed difference between the pump impeller 23p and the turbine runner 23t is small. It should be noted, however, that the starting device 23 may not be provided with the stator 23s and the one-way clutch 23o so that the pump impeller 23p and the turbine runner 23t function only as a fluid coupling. The damper mechanism 24 includes an input element coupled to the lock-up clutch 25, an intermediate element coupled to the input element via a plurality of first elastic members, an output element coupled to the intermediate element via a plurality of second elastic members and fixed to a turbine hub, and so forth, for example. The lock-up clutch 25 selectively establishes and releases lock-up in which the pump impeller 23p and the turbine runner 23t, that is, the front cover 18 and the input shaft 41 of the CVT 40, are mechanically coupled to each other (via the damper mechanism 24). The lock-up clutch 25 may be constituted as a hydraulic single-plate friction clutch, or may be constituted as a hydraulic multi-plate friction clutch.

The oil pump 30 is constituted as a so-called gear pump that includes a pump assembly composed of a pump body 31 and a pump cover 32 disposed between the starting device 23 and the forward/reverse switching mechanism 35, an inner rotor (externally toothed gear) 33, an outer rotor (internally toothed gear) 34, and so forth. The pump body 31 and the pump cover 32 are fixed to the converter housing 22a or the transaxle case 22b. In addition, the inner rotor 33 is coupled to the pump impeller 23p via a hub. Thus, when the inner rotor 33 is rotated by power from the engine 12, the oil pump 30 suctions working oil (ATF) in an oil pan (working oil storage portion) (not illustrated) via a strainer (not illustrated), and supplies (discharges) the working oil, the pressure of which has been raised, to the hydraulic control device 60.

The forward/reverse switching mechanism 35 is housed inside the transaxle case 22b, and includes a double-pinion planetary gear mechanism 36, and a brake B1 and a clutch C1 that serve as hydraulic friction engagement elements. The planetary gear mechanism 36 includes a sun gear fixed to the input shaft 41 of the CVT 40, a ring gear, and a carrier that supports a pinion gear meshed with the sun gear and a pinion gear meshed with the ring gear and that is coupled to a primary shaft 42 of the CVT 40. The brake B1 disengages the ring gear of the planetary gear mechanism 36 from the transaxle case 22b such that the ring gear of the planetary gear mechanism 36 is rotatable, and holds the ring gear of the planetary gear mechanism 36 unrotatably stationary with respect to the transaxle case 22b when a hydraulic pressure is supplied from the hydraulic control device 60. Meanwhile, the clutch C1 disengages the carrier of the planetary gear mechanism 36 from the input shaft 41 (sun gear) such that the carrier of the planetary gear mechanism 36 is rotatable, and couples the carrier of the planetary gear mechanism 36 to the input shaft 41 when a hydraulic pressure is supplied from the hydraulic control device 60. Consequently, by disengaging the brake B1 and engaging the clutch C1, it is possible to transmit power transmitted to the input shaft 41 as it is to the primary shaft 42 of the CVT 40 to drive the automobile 10 forward. By engaging the brake B1 and disengaging the clutch C1, meanwhile, it is possible to transmit rotation of the input shaft 41 to the primary shaft 42 of the CVT 40 with the direction of the rotation inverted to drive the automobile 10 rearward. By disengaging the brake B1 and the clutch C1, further, it is possible to release connection between the input shaft 41 and the primary shaft 42.

The CVT 40 includes: a primary pulley 43 provided on the primary shaft 42 which serves as a driving rotary shaft; a secondary pulley 45 provided on a secondary shaft 44 that serves as a driven rotary shaft disposed in parallel with the primary shaft 42; a belt 46 that extends between a groove of the primary pulley 43 and a groove of the secondary pulley 45; a primary cylinder 47 which is a hydraulic actuator that changes the width of the groove of the primary pulley 43; and a secondary cylinder 48 which is a hydraulic actuator that changes the width of the groove of the secondary pulley 45. The primary pulley 43 is composed of a fixed sheave 43a formed integrally with the primary shaft 42, and a movable sheave 43b supported so as to be slidable in the axial direction with respect to the primary shaft 42 via a ball spline. Meanwhile, the secondary pulley 45 is composed of a fixed sheave 45a formed integrally with the secondary shaft 44, and a movable sheave 45b supported so as to be slidable in the axial direction with respect to the secondary shaft 44 via a ball spline and urged in the axial direction by a return spring 49 which is a compression spring.

The primary cylinder 47 is formed behind the movable sheave 43b of the primary pulley 43. The secondary cylinder 48 is formed behind the movable sheave 45b of the secondary pulley 45. Working oil is supplied from the hydraulic control device 60 to the primary cylinder 47 and the secondary cylinder 48 in order to vary the widths of the grooves of the primary pulley 43 and the secondary pulley 45. This makes it possible to output power transmitted from the engine 12 to the primary shaft 42 via the starting device 23 and the forward/reverse switching mechanism 35 with the speed of the power varied steplessly. Then, the power output to the secondary shaft 44 is transmitted to the left and right drive wheels DW via the gear mechanism 50, the differential gear 57, and the drive shafts.

The gear mechanism 50 includes: a counter drive gear 51 rotatably supported by the transaxle case 22b via a bearing; a counter shaft 52 that extends in parallel with the secondary shaft 44 and the drive shafts 59 and that is rotatably supported by the transaxle case 22b via a bearing; a counter driven gear 53 fixed to the counter shaft 52 and meshed with the counter drive gear 51; a drive pinion gear (final drive gear) 54 formed (or fixed) on the counter shaft 52; and a differential ring gear (final driven gear) 55 meshed with the drive pinion gear 54 and coupled to the differential gear 57.

The hydraulic control device 60 is connected to the oil pump 30 discussed above, which is driven by power from the engine 12 to suction working oil from the oil pan via a strainer and pump the working oil. The hydraulic control device 60 regulates a hydraulic pressure from the oil pump 30 to generate a hydraulic pressure required by the starting device 23, the forward/reverse switching mechanism 35, the CVT 40, and so forth, and supplies working oil that serves as a lubrication medium to predetermined portions such as the CVT 40, the one-way clutch 23o, and the forward/ reverse switching mechanism 35 and objects to be lubricated such as various bearings. To this end, the hydraulic control device 60 includes: a primary regulator valve that regulates the pressure of working oil from the oil pump 30 to generate a line pressure PL that serves as a source pressure for a hydraulic pressure to be supplied to the primary cylinder 47, the secondary cylinder 48, and so forth; a modulator valve that decreases the line pressure PL to generate a constant modulator pressure Pmod; a pressure regulation valve (linear solenoid valve) that regulates the modulator pressure Pmod from the modulator valve to generate a hydraulic pressure for the brake B1 or the clutch C1; and a manual valve that operates in conjunction with a shift lever 95 (see FIG. 1) to supply working oil from the pressure regulation valve to one of the brake B1 and the clutch C1 in accordance with the shift position and block supply of a hydraulic pressure to the brake B1 and the clutch C1.

In order to generate a hydraulic pressure required for shifting of the CVT 40, the hydraulic control device 60 further includes a first linear solenoid valve, a second linear solenoid valve, a primary pulley pressure control valve, and a secondary pulley pressure control valve. The first linear solenoid valve regulates the modulator pressure Pmod to generate a primary solenoid pressure Pslp that serves as a signal pressure, for example. The second linear solenoid valve regulates the modulator pressure Pmod to generate a secondary solenoid pressure Psls that serves as a signal pressure, for example. In addition, the primary pulley pressure control valve regulates the line pressure PL using the primary solenoid pressure Pslp from the first linear solenoid valve as a signal pressure to generate a primary pulley pressure (primary sheave pressure) Pp for the primary pulley 43, that is, the primary cylinder 47. The secondary pulley pressure control valve regulates the line pressure PL using the secondary solenoid pressure Psls from the second linear solenoid valve as a signal pressure to generate a secondary pulley pressure (secondary sheave pressure) Ps for the secondary pulley 45, that is, the secondary cylinder 48.

The speed change ECU 21 which controls the power transmission device 20 discussed above is also structured as a microcomputer including a CPU (not illustrated) as a main component, and includes a ROM that stores various programs, a RAM that temporarily stores data, input and output ports and a communication port (not illustrated), and so forth besides the CPU. As illustrated in FIG. 1, the speed change ECU 21 receives inputs such as signals from various sensors such as the accelerator operation amount from the accelerator pedal position sensor 92, the vehicle speed from the vehicle speed sensor 97, and the shift position from a shift position sensor 96 that detects the operating position of the shift lever 95 for selecting a desired shift position from a plurality of shift positions, and signals from the engine ECU 14 and the brake ECU 16.

As illustrated in FIG. 1, the speed change ECU 21 also receives inputs such as signals from an input rotational speed sensor 98 that detects an input rotational speed (the rotational speed of the input shaft 41 or the primary shaft 42) Nin of the CVT 40, an output rotational speed sensor 99 that detects an output rotational speed (the rotational speed of the secondary shaft 44) Nout of the CVT 40, and an oil temperature sensor (not illustrated) that detects an oil temperature Toil of working oil in the hydraulic control device 60. The speed change ECU 21 controls the starting device 23 and the CVT 40, that is, the pressure regulation valves and the first and second linear solenoid valves discussed above and so forth which compose the hydraulic control device 60, on the basis of the input signals discussed above. In controlling such valves, the speed change ECU 21 controls a drive circuit (not illustrated) such that a current that matches a hydraulic pressure command value is applied from an auxiliary battery (not illustrated) to solenoid portions of the respective valves.

Further, a mode select switch 100 that allows the driver of the automobile 10 to select a desired control mode from a plurality of control modes of the CVT 40 is connected to the speed change ECU 21. In the embodiment, the mode select switch 100 is configured to allow the driver to select one of a normal mode (continuously variable speed change mode), in which a speed ratio γ of the CVT 40 is steplessly changeable, and a sport mode (stepped speed change mode), in which the speed ratio γ is changeable stepwise (a stepwise upshift is performed). In the case where the normal mode (continuously variable speed change mode) is selected by the driver via the mode select switch 100, the speed change ECU 21 sets a mode flag Fm to a value of 0. In the case where the sport mode (stepped speed change mode) is selected by the driver via the mode select switch 100, the speed change ECU 21 sets the mode flag Fm to a value of 1, and has the set value stored in the RAM (not illustrated).

Figure 3:
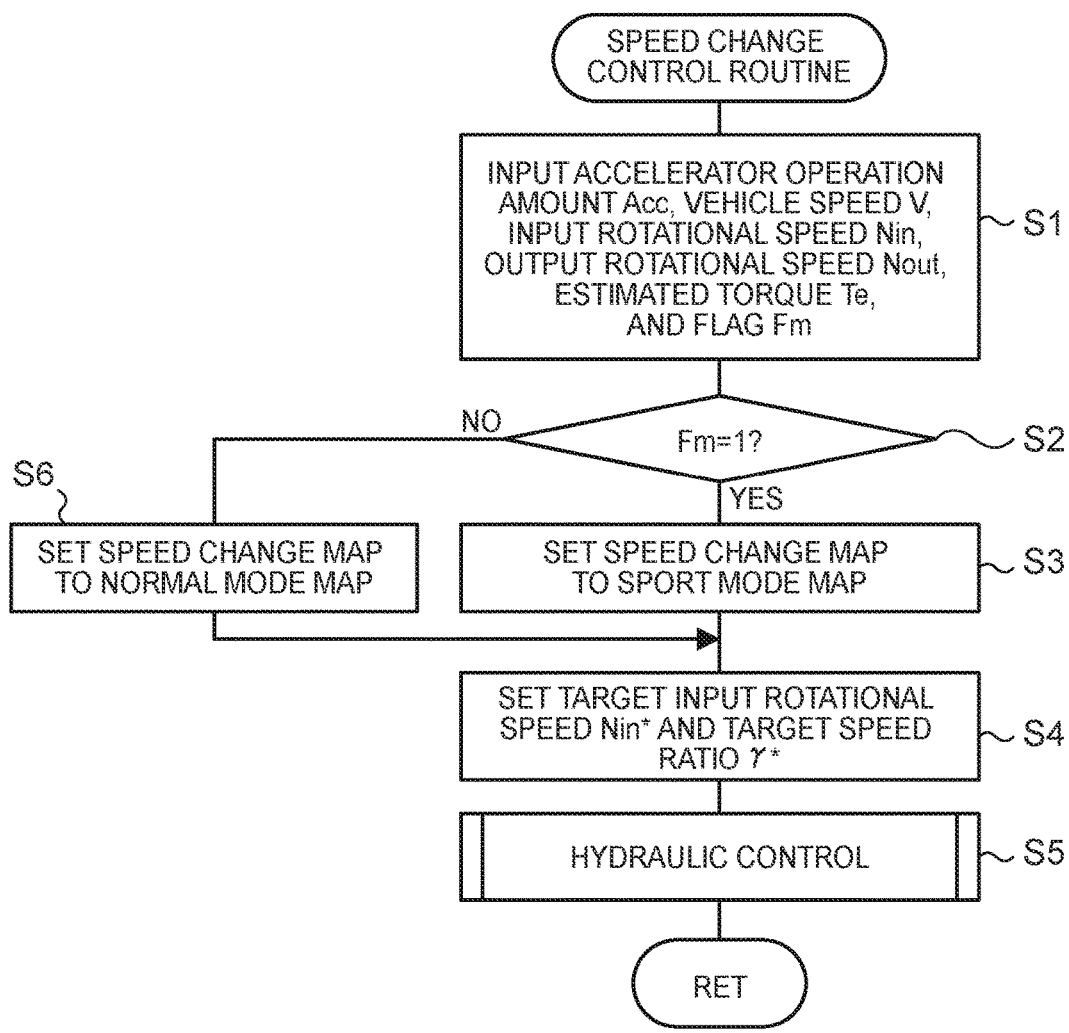
FIG. 3 is a flowchart illustrating an example of a speed change control routine executed by a control device for a continuously variable transmission according to a first embodiment of the present disclosure.

Next, speed change control for the CVT 40 discussed above will be described. FIG. 3 is a flowchart illustrating an example of a speed change control routine executed by the speed change ECU 21 repeatedly at intervals of a predetermined time when the accelerator pedal 91 is depressed by the driver.

When the speed change control routine of FIG. 3 is started, the speed change ECU 21 receives data that are necessary for control such as the accelerator operation amount (current accelerator operation amount) Acc from the accelerator pedal position sensor 92, the vehicle speed (current vehicle speed) V from the vehicle speed sensor 97, the input rotational speed (current input rotational speed) Nin from the input rotational speed sensor 98, the output rotational speed Nout from the output rotational speed sensor 99, estimated engine torque Te from the engine ECU 14, and the value of the mode flag Fm (step S1). Then, the speed change ECU 21 determines whether or not the mode flag Fm has a value of 1, that is, whether or not the sport mode is selected by the driver as the control mode for the CVT 40 (step S2).

In the case where it is judged in step S2 that the normal mode is selected by the driver as the control mode for the CVT 40 with the mode flag Fm having a value of 0, the speed change ECU 21 sets a normal mode map (a speed change map for continuous variable speed change control) (not illustrated) as a speed change map used to set a target speed ratio γ* for the CVT 40 (step S6). The normal mode map has been prepared in advance so as to prescribe, for each accelerator operation amount Acc, a target input rotational speed Nin* which is a target value for the input rotational speed Nin (rotational speed Ne of the engine 12) corresponding to the vehicle speed V at the time when the speed ratio γ of the CVT 40 is steplessly changed in order to improve the fuel efficiency of the automobile 10, and stored in the ROM (not illustrated) of the speed change ECU 21.

Figure 4:
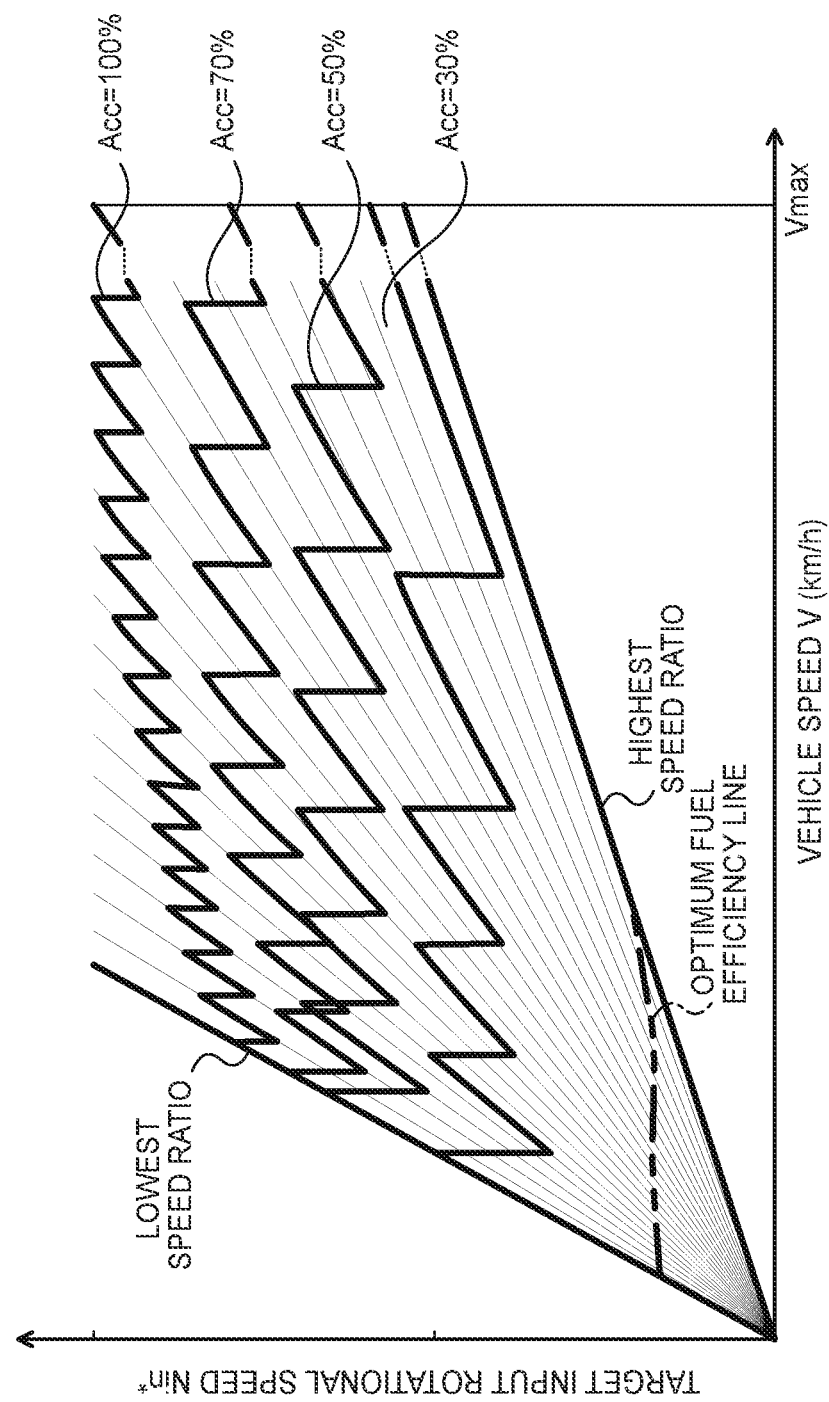
FIG. 4 illustrates an example of a speed change map used to change the speed ratio of the continuously variable transmission stepwise.

In the case where it is judged in step S2 that the sport mode is selected by the driver as the control mode for the CVT 40 with the mode flag Fm having a value of 1, meanwhile, the speed change ECU 21 sets a sport mode map (a speed change map for stepped speed change control) illustrated in FIG. 4 as the speed change map used to set the target speed ratio γ* for the CVT 40 (step S3). The sport mode map has been prepared in advance so as to prescribe, for each accelerator operation amount Acc, the target input rotational speed Nin* which is a target value for the input rotational speed Nin (rotational speed Ne of the engine 12) corresponding to the vehicle speed V at the time when the speed ratio γ of the CVT 40 is changed stepwise (at the time when a stepwise upshift, that is, processing for steeply lowering the target input rotational speed Nin*, is performed) in order to improve the drivability of the automobile 10, and stored in the ROM (not illustrated) of the speed change ECU 21.

After the processing in step S3 or S6, the speed change ECU 21 derives, from the normal mode map or the sport mode map set as the speed change map, the target input rotational speed Nin* corresponding to the accelerator operation amount Acc and the vehicle speed V input in step S1 while performing linear interpolation as appropriate, and sets the target speed ratio γ* for the CVT 40 on the basis of the derived target input rotational speed Nin* and the output rotational speed Nout input in step S1 (step S4). Then, the speed change ECU 21 controls the first linear solenoid valve such that the primary pulley pressure Pp from the primary pulley pressure control valve of the hydraulic control device 60 is brought to a value that matches the target speed ratio γ* on the basis of a difference between the input rotational speed Nin input in step S1 and the target input rotational speed Nin* or the like (step S5). In step S5, in addition, the speed change ECU 21 controls the second linear solenoid valve on the basis of the estimated engine torque Te or the like such that slip of the belt 46 of the CVT 40 is suppressed by the secondary pulley pressure Ps from the secondary pulley pressure control valve. Then, the speed change ECU 21 repeatedly executes the processing in and after step S1 while the accelerator pedal 91 is depressed.

Subsequently, the procedure for preparing the sport mode map for the CVT 40 illustrated in FIG. 4, that is, a speed change map used to change the speed ratio γ of the CVT 40 stepwise (perform a stepwise upshift), will be described.

The inventors conducted diligent studies in order to improve the drivability of a vehicle by changing the speed ratio γ of a continuously variable transmission stepwise (performing a stepwise upshift). In the course of the studies, the inventors first focused on how the driver felt acceleration of the vehicle. According to the studies by the inventors, the driver of the vehicle not only perceives the actual behavior (manner of variation) of vehicle acceleration (acceleration in the forward direction) but also senses state variations accompanied by acceleration of the vehicle such as variations in engine sound, and it is considered that the acceleration feel can be enhanced by atmospheric factors such as variations in engine sound. That is, it is considered that the driver feels that (direct) acceleration that matches his/her accelerator operation has been obtained (hereinafter, such a sensation is referred to as a "sense of directness") if the vehicle accelerates linearly in accordance with the amount of depression of the accelerator pedal, and that the driver further feels an atmospheric acceleration feel (hereinafter, such a sensation is referred to as a "sense of rhythm") if the engine sound is varied rhythmically along with acceleration of the vehicle.

Based on such an analysis, the inventors attempted to change the speed ratio γ of the continuously variable transmission stepwise more finely than common automatic transmissions with four to eight shift speeds, for example, in order to adequately provide both the sense of directness and the sense of rhythm discussed above in accordance with the intention of acceleration of the driver. Then, in order to optimize the number of change steps of the speed ratio γ which corresponds to the number of shift speeds of a stepped transmission etc., the inventors made comparisons and examinations on the sense of directness and the sense of rhythm obtained in the case where the number of change steps of the speed ratio γ, that is, the number of allowable stepwise upshifts, to be made during a period after the vehicle started until the vehicle speed V reached a maximum vehicle speed Vmax, that is, until a time $t_{0\text{-}Vmax}$ during which the vehicle speed was increased from zero to the maximum vehicle speed Vmax elapsed, was set to a significantly large value, e.g. 100 steps, and in the case where such a number was set to a significantly small value, e.g. about four steps.

Figure 5A:
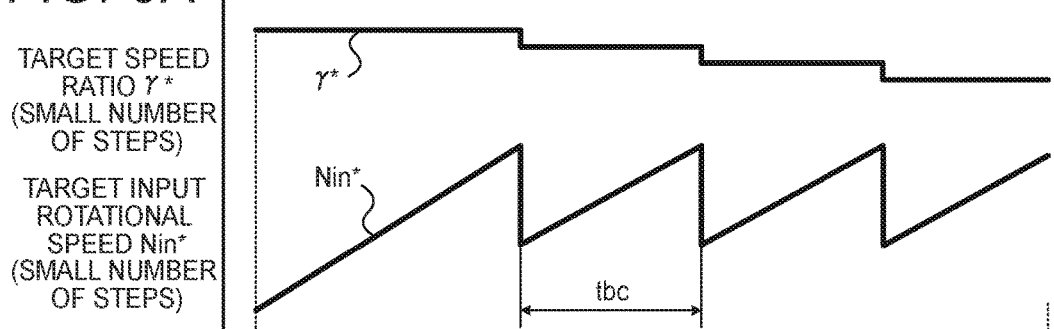
FIGS. 5A, 5B, 5C, and 5D illustrate the shifting interval time and variations in vehicle acceleration for a case where the number of change steps of the speed ratio of the continuously variable transmission is significantly large and for a case where such a number is significantly small.
Figure 5B:
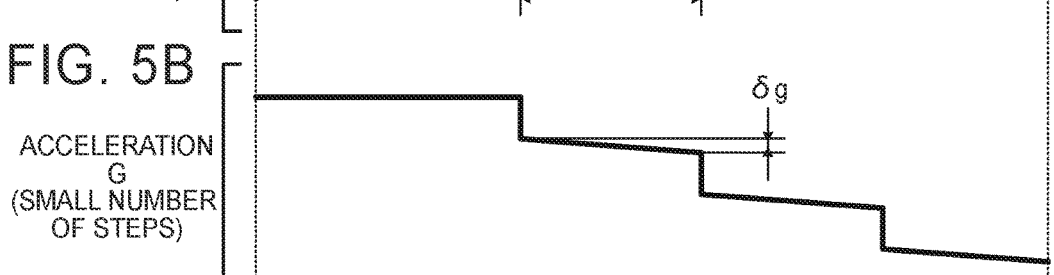

In the case where the number of change steps for the continuously variable transmission to be made during a period during which the vehicle speed is increased from zero to the maximum vehicle speed Vmax is set to a small value, e.g. four steps, a shifting interval time tbc for stepwise changes of the speed ratio γ of the continuously variable transmission, that is, the execution interval between stepwise upshifts, is long as illustrated in FIG. 5A, and an amount of variation δg in vehicle acceleration G within the shifting interval time tbc is significantly small (a significantly small negative value). Thus, in the case where the number of change steps of the speed ratio γ is set to a significantly small value, it is considered to be possible to provide the driver with some sense of directness. In the case where the number of change steps is set to a significantly small value, however, the frequency of variations in engine sound along with changes in speed ratio γ may be so low, because of the long shifting interval time tbc, that the driver is rather provided with a sluggish feel, and it is considered that the sense of rhythm may not be improved.

Figure 5C:
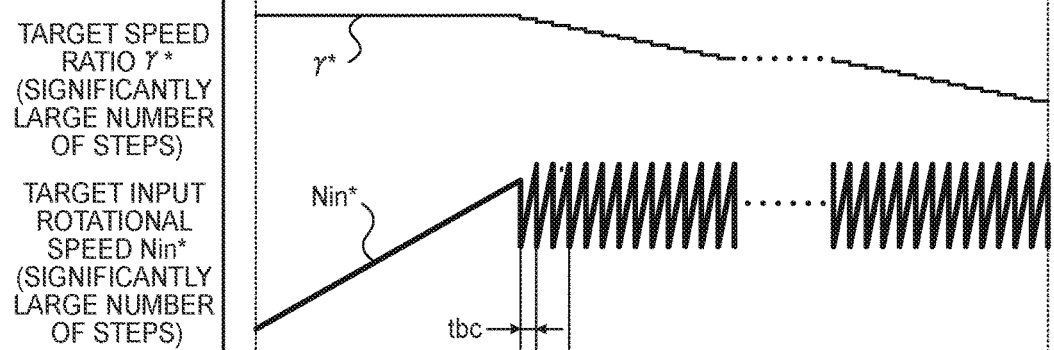

In the case where the number of change steps of the speed ratio γ to be made during a period during which the vehicle speed is increased from zero to the maximum vehicle speed Vmax is set to a significantly large value, e.g. 100 steps, meanwhile, the shifting interval time (execution interval between stepwise upshifts) tbc for stepwise changes of the speed ratio γ of the continuously variable transmission is significantly short as illustrated in FIG. 5C. Thus, in the case where the number of change steps is set to a significantly large value, the frequency of variations in engine sound along with changes in speed ratio γ may be so high as to impair the sense of rhythm, and it is considered that only the so-called sense of busyness (annoyance) may be enhanced.

Figure 5D:
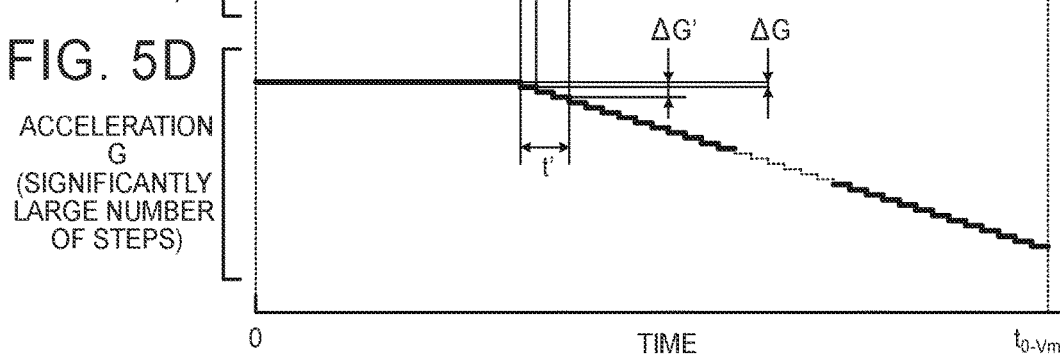

Further, when the accelerator pedal is depressed to accelerate the vehicle, the vehicle acceleration G is lowered along with an increase in vehicle speed V. The studies by the inventors revealed that in the case where the number of change steps of the speed ratio γ was set to a significantly large value to make the shifting interval time tbc significantly short, the driver was not able to feel variations in vehicle acceleration G (amount of variation ΔG in FIG. 5D) in the shifting interval time tbc, but sensed variations in vehicle acceleration G (amount of variation ΔG' in FIG. 5D) that had been made so far when the speed ratio γ was changed stepwise a plurality of times after the speed ratio γ was changed once (at the time point when a time t' in FIG. 5D elapsed after the speed ratio γ was changed once). Thus, if the number of change steps of the speed ratio γ is set to an unnecessarily large value, an acceleration feel that is peculiar to continuously variable transmissions (an acceleration feel that lacks a sense of directness) generally called a "rubber band feel" may not be improved, and the driver may rather be provided with a sense of stalling, and it is considered that the drivability of the vehicle may not be improved.

Then, the studies by the inventors revealed that humans were not able to perceive variations in vehicle acceleration G during the passage of a significantly short time of 0.5 seconds or less, for example, and that there was a lower limit of the time (hereinafter referred to as an "acceleration perception time tref") that allowed humans to perceive variations in vehicle acceleration G. As a result of the studies by the inventors, further, it was found that in the case where the acceleration perception time tref was a value of about 0.6 seconds to 2.5 seconds, for example, and if a rate of variation (gradient) δg/tref in vehicle acceleration G from the start of stepwise changes in speed ratio γ of the continuously variable transmission until the acceleration perception time tref elapsed (it should be noted that "δg" is the amount of variation in vehicle acceleration G during a period from the start of changes in speed ratio γ until the acceleration perception time tref elapsed) was set to a large value, that is, a non-negative value (a relatively small positive value) or a value that is close to zero (flat), it was possible to allow the driver to reliably perceive that the vehicle was accelerating during the period to improve the sense of directness discussed above.

For the intention of acceleration of the driver, it can be considered that the driver generally has a high intention of acceleration in the case where the accelerator operation amount (accelerator depression amount) Acc is large, and that the driver has a higher intention of acceleration in the case where the accelerator operation amount Acc is large and the vehicle speed V is low. In addition, it can be considered that the driver generally has a low intention of acceleration in the case where the vehicle speed V is high, and that the driver has a lower intention of acceleration in the case where the vehicle speed is high and the accelerator operation amount Acc is small.

In the light of the study results discussed above, the inventors determined that the shortest shifting interval time, among all the shifting interval times tbc (at the time when the accelerator operation amount Acc was maximum (100%)), was equal to or more than the acceleration perception time tref (e.g. two seconds) determined in advance within the range of about 0.6 seconds to 2.5 seconds, for example, in consideration of the performance of the vehicle (such as the maximum vehicle speed Vmax and acceleration performance), the characteristics of the engine, and so forth. Further, in addition to determining that the shortest shifting interval time was equal to or more than the acceleration perception time tref (e.g. two seconds), the inventors prepared a sport mode map (speed change map for stepped speed change control) illustrated in FIG. 4, that is, speed change lines (see the thick lines in the drawing) for each accelerator operation amount Acc between a line indicating the minimum speed ratio and a line indicating the maximum speed ratio in FIG. 4, such that the number of change steps of the speed ratio γ of the CVT 40, that is, the number of allowable stepwise upshifts, was larger (smaller) as the accelerator operation amount Acc was larger (smaller) in the case where the accelerator operation amount Acc was constant. In addition, the inventors prepared the speed change lines (see the thick lines in the drawing) for each accelerator operation amount Acc between the line indicating the minimum speed ratio and the line indicating the maximum speed ratio in FIG. 4 so as to meet the following conditions (1) to (4).

(1) As illustrated in FIGS. 6A, 6B, 6C, and 6D, as the accelerator operation amount Acc is larger, the shifting interval time tbc is shorter, and the rate of variation δg/tbc in vehicle acceleration G during the shifting interval time tbc is set to a larger value (closer to being flat).

Figure 6A:
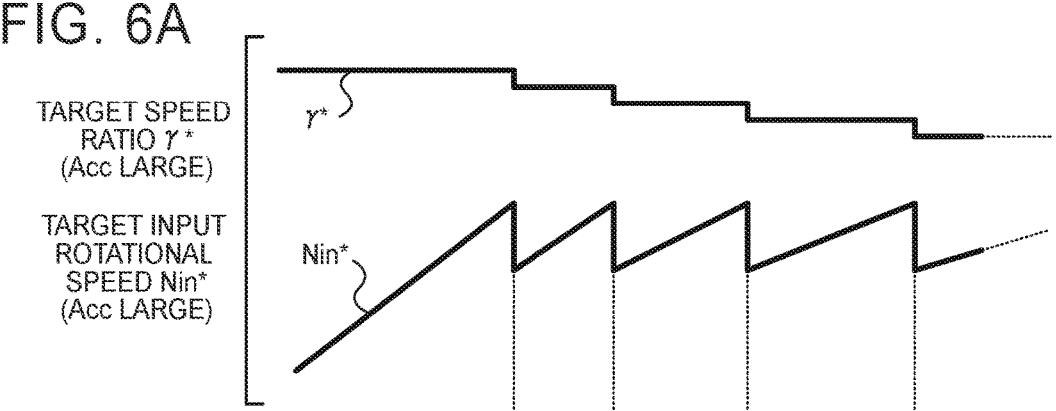
FIGS. 6A, 6B, 6C, and 6D illustrate conditions that should be met by the speed change map of FIG. 4.
Figure 6B:
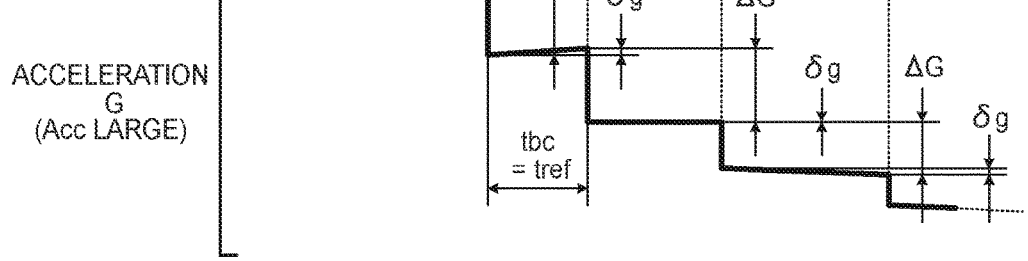
Figure 6C:
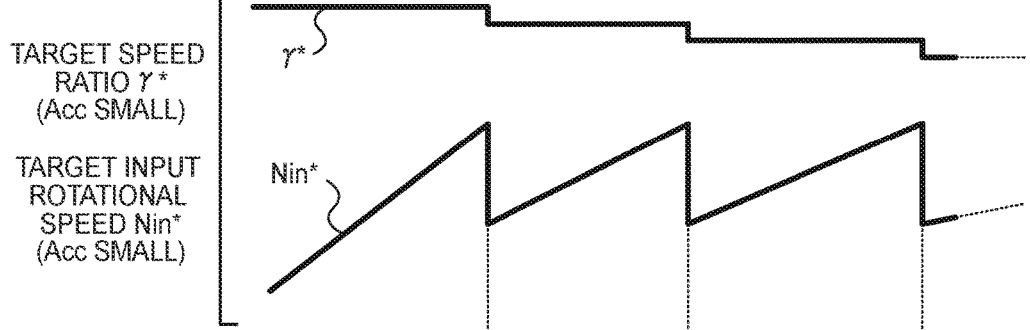
Figure 6D:
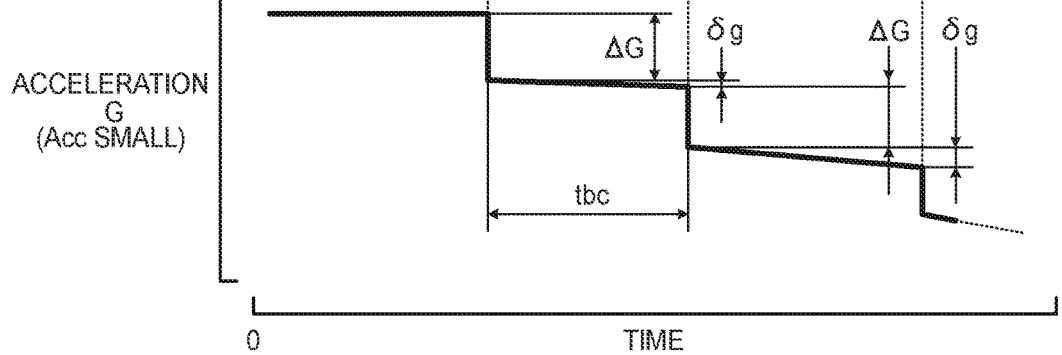

(2) As seen from FIGS. 6A to 6D, as the vehicle speed V becomes higher along with the lapse of time, the shifting interval time tbc is made longer, and the rate of variation δg/tbc in vehicle acceleration G during the shifting interval time tbc is set to a smaller value (sloping down to the left in FIGS. 6B and 6D).

(3) As illustrated in FIGS. 6A to 6D, as the vehicle speed V becomes higher along with the lapse of time, the amount of variation ΔG (amount of reduction) in vehicle acceleration G between before and after a change in speed ratio γ is made smaller (smaller in absolute value).

(4) As illustrated in FIGS. 6A to 6D, as the accelerator operation amount Acc is larger and the vehicle speed V is lower, the amount of variation (amount of reduction) ΔG in vehicle acceleration G between before and after a change in speed ratio γ is larger (larger in absolute value).

In preparing the sport mode map, the number of change steps of the speed ratio γ, or the number of allowable stepwise upshifts (maximum number of steps), to be made during a period during which the vehicle speed was increased from zero to the maximum vehicle speed Vmax when the accelerator operation amount Acc which indicates the intention of acceleration of the driver was maximum (100%) was determined on the basis of the acceleration perception time tref, which allowed humans to perceive variations in vehicle acceleration, and the time $t_{0\text{-}Vmax}$, during which the vehicle speed was increased from zero to the maximum vehicle speed Vmax, in consideration of the conditions (1) to (4). The embodiment is intended for a widely prevalent continuously variable transmission mounted on a vehicle on which an engine with a displacement of about 1.5 L to 3.0 L is mounted, for example, and in consideration of the performance of the vehicle (such as the maximum vehicle speed Vmax and acceleration performance), the characteristics of the engine, and so forth, the number of change steps (maximum number of steps) of the speed ratio γ at the time when the accelerator operation amount Acc is maximum (100%) is set to 24 steps. In the embodiment, further, the number of change steps of the speed ratio γ at the time when the accelerator operation amount Acc is 70% is set to 12 steps, the number of change steps of the speed ratio γ at the time when the accelerator operation amount Acc is 50% is set to nine steps, and the number of change steps of the speed ratio γ at the time when the accelerator operation amount Acc is 30% is set to six steps. In this way, the vehicle acceleration G and the engine sound of the vehicle on which the CVT 40 is mounted can be adequately varied in accordance with the intention of acceleration of the driver by increasing the number of allowable stepwise upshifts as the accelerator operation amount Acc achieved by the driver of the automobile 10 is larger in the case where the accelerator operation amount Acc is constant. Thus, the drivability of the automobile 10 can be improved.

When a comparison is made among the speed change lines for each accelerator operation amount Acc in the sport mode map of FIG. 4, a speed change line corresponding to a larger accelerator operation amount Acc has a larger number of change steps of the speed ratio γ, the amount of variation ΔG (amount of reduction) in vehicle acceleration G between before and after a change in speed ratio γ is larger (larger in absolute value) as the vehicle speed V is lower, and the rate of variation δg/tbc in vehicle acceleration G during the shifting interval time tbc becomes gently smaller (larger in absolute value) as the vehicle speed V becomes higher. In addition, for the speed change lines in the sport mode map of FIG. 4, as seen from FIGS. 6A to 6D, as the vehicle speed V becomes higher along with the lapse of time (as the vehicle speed V is higher), the shifting interval time tbc is longer, the rate of variation δg/tbc in vehicle acceleration G during the shifting interval time tbc is set to a smaller value (sloping down to the left in FIGS. 6B and 6D), and the amount of variation ΔG (amount of reduction) in vehicle acceleration G between before and after a change in speed ratio γ is smaller (smaller in absolute value).

When the speed change control routine (steps S1 to S5) discussed above in which the sport mode map prepared as discussed above is used is executed, as the accelerator pedal 91 is depressed to increase the accelerator operation amount Acc, the shifting interval time tbc becomes shorter, and the rate of variation δg/tbc in vehicle acceleration G during the shifting interval time tbc is set to a larger value (closer to being flat). In addition, as the vehicle speed V becomes higher in response to depression of the accelerator pedal 81, the shifting interval time tbc becomes longer, and the rate of variation δg/tbc in vehicle acceleration G during the shifting interval time tbc is set to a smaller value.

In this way, by making the shifting interval time tbc, that is, the execution interval between stepwise upshifts, shorter as the accelerator operation amount Acc is larger, an atmospheric acceleration feel, that is, a sense of rhythm, to be felt by the driver can be improved by rhythmically varying the engine sound of the automobile 10 in the case where the accelerator operation amount Acc is large and the intention of acceleration of the driver is high. As a result, it is possible to improve the drivability of the automobile 10 on which the CVT 40 is mounted by improving the sense of rhythm obtained when stepwise upshifts are made in the case where the accelerator operation amount Acc is large and the intention of acceleration of the driver is high.

In addition, if the shifting interval time tbc is made shorter as the accelerator operation amount Acc is larger and the shifting interval time tbc is made longer as the vehicle speed V is higher, the execution interval between stepwise upshifts (shifting interval time tbc) becomes longer as the number of executions of stepwise upshifts is increased when the automobile 10 is accelerating in response to depression of the accelerator pedal 91. That is, if the vehicle speed V becomes higher when the automobile 10 accelerates in response to depression of the accelerator pedal 91, the intention of acceleration of the driver becomes gradually lower even if the accelerator pedal 91 is depressed, and the driver may be given a sense of discomfort if the execution interval between stepwise upshifts (shifting interval time tbc) is made shorter in such a state. If the shifting interval time tbc is made longer as the number of executions of stepwise upshifts is increased when the automobile 10 is accelerating, that is, the execution interval between stepwise upshifts is made longer as the number of executions of stepwise upshifts during acceleration is increased, in contrast, fluctuations in engine sound can be made more adequate so as to match the intention of acceleration of the driver. Consequently, it is possible to suppress impairment of the sense of rhythm, that is, occurrence of the so-called sense of busyness, during acceleration of the automobile 10, and thus to improve the drivability of the automobile 10 on which the CVT 40 is mounted by improving the sense of rhythm obtained when stepwise upshifts are made.

In the embodiment, further, as discussed above, the shortest shifting interval time, among all the shifting interval times tbc, is the acceleration perception time tref (in the embodiment, two seconds or more) discussed above which allows humans to perceive variations in vehicle acceleration G. Thus, if the rate of variation δg/tbc in vehicle acceleration G during the shifting interval time tbc is set to a larger value (closer to being flat) as the accelerator operation amount Acc is larger, it is possible to improve the sense of directness by allowing the driver to reliably perceive that the automobile 10 is accelerating between the timings to change the speed ratio γ in the case where the accelerator operation amount Acc is large and the intention of acceleration of the driver is high, in particular in the case where the accelerator operation amount Acc is large, the vehicle speed V is low, and the intention of acceleration of the driver is higher. Then, by setting the shortest shifting interval time, among all the shifting interval times tbc, as the acceleration perception time tref (in the embodiment, two seconds or more) discussed above which allows humans to perceive variations in vehicle acceleration G, it is possible to improve the sense of directness in the case where the accelerator operation amount Acc is large and the intention of acceleration of the driver is high, and to determine all the shifting interval times tbc so as to rhythmically vary the engine sound when the speed ratio γ is changed stepwise.

In addition, by making the shifting interval time tbc longer as the vehicle speed V of the automobile 10 is higher, it is possible to suppress impairment of the sense of rhythm, that is, occurrence of the so-called sense of busyness, by suppressing frequent fluctuations in engine sound of the automobile 10 in the case where the vehicle speed V is high and the intention of acceleration of the driver is low, in particular in the case where the vehicle speed V is high, the accelerator operation amount Acc is small, and the intention of acceleration of the driver is lower. Further, by setting the rate of variation δg/tbc in vehicle acceleration G during the shifting interval time tbc to a smaller value (a negative value with a larger absolute value) as the vehicle speed V is higher, it is possible to optimize the sense of directness by allowing the driver, who has made the accelerator operation amount Acc smaller along with an increase in vehicle speed V, to feel that (smooth) acceleration that matches his/her accelerator operation has been obtained in the case where the vehicle speed V is high and the intention of acceleration of the driver is low, in particular in the case where the vehicle speed V is high, the accelerator operation amount Acc is small, and the intention of acceleration of the driver is lower.

Additionally, when the speed change control routine (steps S1 to S5) discussed above in which the sport mode map discussed above is used is executed, the amount of variation ΔG (amount of reduction) in vehicle acceleration G between before and after a change in speed ratio γ is smaller (smaller in absolute value) as the vehicle speed V is higher. Consequently, it is possible to optimize the sense of directness by allowing the driver, who has made the accelerator operation amount Acc smaller along with an increase in vehicle speed V, to feel that (smooth) acceleration that matches his/her accelerator operation has been obtained in the case where the vehicle speed V is high and the intention of acceleration of the driver is low, in particular in the case where the vehicle speed V is high, the accelerator operation amount Acc is small, and the intention of acceleration of the driver is lower. In addition, when the speed change control routine (steps S1 to S5) in which the sport mode map is used is executed, the amount of variation (amount of reduction) ΔG in vehicle acceleration G between before and after a change in speed ratio γ is larger (larger in absolute value) as the accelerator operation amount Acc is larger and the vehicle speed V is lower. Consequently, it is possible to further improve an atmospheric acceleration feel, that is, a sense of rhythm, to be felt by the driver because of fluctuations in vehicle acceleration G in the case where the accelerator operation amount Acc is large, the vehicle speed V is low, and the intention of acceleration of the driver is higher.

As a result, with the automobile 10 incorporating the CVT 40 which is controlled by the speed change ECU 21, it is possible to improve the sense of rhythm and the sense of directness obtained when the speed ratio γ of the CVT 40 is changed stepwise in the case where the accelerator operation amount Acc is large and the intention of acceleration of the driver is high, in particular in the case where the accelerator operation amount Acc is large, the vehicle speed V is low, and the intention of acceleration of the driver is higher. With the automobile 10, in addition, it is possible to optimize the sense of rhythm and the sense of directness obtained when the speed ratio γ of the CVT 40 is changed stepwise in the case where the vehicle speed V is high and the intention of acceleration of the driver is low, and in the case where the vehicle speed V is high, the accelerator operation amount Acc is small, and the intention of acceleration of the driver is lower. Thus, with the automobile 10 incorporating the CVT 40 which is controlled by the speed change ECU 21, it is possible to improve the drivability significantly favorably.

In the embodiment, in addition, the mode select switch 100, which allows the driver to select one of the normal mode (continuously variable speed change mode), in which the speed ratio γ is steplessly changeable, and the sport mode (stepped speed change mode), in which the speed ratio γ is changeable stepwise, is connected to the speed change ECU 21, and the speed change ECU 21 executes a stepwise change in speed ratio γ, that is, a stepwise upshift, when the sport mode is selected by the driver. Consequently, it is possible to improve the drivability of the automobile 10 by changing the speed ratio γ stepwise in the sport mode, and to improve the fuel efficiency of the automobile 10 by steplessly changing the speed ratio γ in the normal mode. When depression of the accelerator pedal 91 is temporarily canceled and thereafter the accelerator pedal 91 is depressed again during travel in the sport mode, the target speed ratio γ* is not necessarily determined as the speed ratio γ that matches the target input rotational speed Nin* which is determined on the basis of the vehicle speed V and the accelerator operation amount Acc at the time. In this case, the target speed ratio γ* may be determined as a speed ratio that is on the lower speed side than the speed ratio that matches the target input rotational speed Nin* which is determined on the basis of the vehicle speed V and the accelerator operation amount Acc at the time when the accelerator pedal 91 is depressed again, for example.

As has been described above, the speed change ECU 21 according to the embodiment which controls the CVT 40 which is mounted on the automobile 10 steplessly changes the speed ratio γ of the CVT 40, and executes a stepwise change of the speed ratio γ, that is, a stepwise upshift. In the case where the accelerator operation amount Acc is constant, the number of change steps of the speed ratio γ which corresponds to the number of shift speeds of a stepped transmission, that is, the number of allowable stepwise upshifts, is larger as the accelerator operation amount Acc is larger. In this way, the vehicle acceleration G and the engine sound of the automobile 10 can be adequately varied in accordance with the intention of acceleration of the driver by increasing the number of allowable stepwise upshifts as the accelerator operation amount Acc, that is, the accelerator depression amount achieved by the driver, is larger in the case where the accelerator operation amount Acc is constant.

Thus, the drivability of the automobile 10 can be improved significantly favorably by achieving both the sense of directness and the sense of rhythm.

In the embodiment, in addition, the number of change steps of the speed ratio γ, that is, the number of allowable stepwise upshifts (maximum number of steps), to be made during a period during which the vehicle speed is increased from zero to the maximum vehicle speed Vmax when the accelerator operation amount Acc which indicates the intention of acceleration of the driver is maximum (100%) is determined on the basis of the acceleration perception time tref, which allows humans to perceive variations in vehicle acceleration G, and the time $t_{0-Vmax}$, during which the vehicle speed is increased from zero to the maximum vehicle speed Vmax. Consequently, it is possible to determine the maximum value of change steps (number of allowable upshifts) to be made when the speed ratio γ of the CVT 40 is changed stepwise within an adequate range that may improve the drivability of the automobile 10 by achieving both the sense of rhythm and the sense of directness in accordance with the performance of the automobile 10 (such as the maximum vehicle speed and acceleration performance), the characteristics of the engine, and so forth.

In the embodiment, the speed change ECU 21 which executes the routine of FIG. 3 corresponds to the "control device for a continuously variable transmission", and the speed change ECU 21 which executes the processing in steps S1 to S5 of FIG. 3 corresponds to the "controller". In the embodiment, in addition, the number of change steps (maximum number of steps) of the speed ratio γ at the time when the accelerator operation amount Acc is maximum (100%), that is, the number of allowable stepwise upshifts, is 24 steps. However, the present disclosure is not limited thereto. That is, according to the studies by the inventors, it has been revealed that the drivability of a diversity of automobiles that are available in the market can be improved by determining the number of change steps (maximum number of steps) of the speed ratio γ at the time when the accelerator operation amount Acc is maximum (100%) as a value within the range of 12 steps to 48 steps, more preferably within the range of 16 steps to 36 steps. In this case, in the light of the fact that the number of shift speeds of widely prevalent continuously variable transmissions is four steps, six steps, or eight steps, the number of change steps (maximum number of steps) at the time when the accelerator operation amount Acc is maximum (100%) is preferably a common multiple of all or any two of the values of four, six, and eight.

In the embodiment, further, the CVT 40 is not limited to the continuously variable transmission of a belt type, and may also be a mechanical continuously variable transmission such as a continuously variable transmission of a toroidal type and a continuously variable transmission of a cone type, for example. Alternatively, the CVT 40 may be an electric continuously variable transmission that includes at least one electric motor (motor generator), or an electric continuously variable transmission that includes a planetary gear and two electric motors (motor generators). In such a case, the rotational speed of the engine or the like may be used in place of the input rotational speed Nin, and a target engine rotational speed may be used in place of the target input rotational speed Nin*. Then, the operation amount of the throttle valve 13 may be used in place of the accelerator operation amount Acc as a parameter used to change the speed ratio γ of the CVT 40 stepwise.

Subsequently, a second embodiment of the present disclosure will be described with reference to FIGS. 7 to 13.

FIG. 7 is a flowchart illustrating an example of a speed change control routine executed repeatedly at time intervals dt (e.g. several milliseconds) determined in advance by a speed change ECU 21 according to the second embodiment when the accelerator pedal 91 is depressed by the driver of the automobile 10.

When the speed change control routine of FIG. 7 is started, the speed change ECU 21 receives data that are necessary for control such as the current accelerator operation amount Acc transmitted from the accelerator pedal position sensor 92, the current vehicle speed V transmitted from the vehicle speed sensor 97, the input rotational speed Nin transmitted from the input rotational speed sensor 98, the output rotational speed Nout transmitted from the output rotational speed sensor 99, the estimated engine torque Te transmitted from the engine ECU 14, and the values of the mode flag Fm, a stepped upshift execution flag Fup, a first speed flag F1, a kickdown flag Fkd, and a step-down flag Fsd (step S10). Then, the speed change ECU 21 determines, on the basis of the current accelerator operation amount Acc, the current vehicle speed V, and the value of the kickdown flag Fkd input in step S10, whether or not it is necessary to execute a kickdown in which the speed ratio γ of the CVT 40 is varied similarly to a stepped automatic transmission in response to a kickdown operation by the driver (whether or not conditions for executing a kickdown are met) (step S20).

In step S20, the speed change ECU 21 determines: whether or not the current vehicle speed V input in step S10 is equal to or more than a threshold Vkd determined in advance; whether or not the current accelerator operation amount Acc input in step S10 is equal to or more than a threshold Akd determined in advance; whether or not an amount of variation ΔAcc (=Acc−preceding Acc) in accelerator operation amount per execution interval of the routine is equal to or more than a threshold ΔAdk determined in advance; and whether or not the kickdown flag Fkd has a value of 1. In the case where the current vehicle speed V is equal to or more than the threshold Vkd, the current accelerator operation amount Acc is equal to or more than the threshold Akd, and the amount of variation ΔAcc in accelerator operation amount is equal to or more than the threshold ΔAkd, and in the case where the kickdown flag Fkd has a value of 1, the speed change ECU 21 determines that it is necessary to execute a kickdown (step S30). In the case where such conditions are not met, meanwhile, the speed change ECU 21 determines in step S30 that it is not necessary to execute a kickdown. For a vehicle that includes a so-called kickdown switch, it may be determined in step S20 whether or not it is necessary to execute a kickdown on the basis of the operating state of the kickdown switch. In the case where it is determined in step S30 that it is not necessary to execute a kickdown, the speed change ECU 21 determines whether or not the mode flag Fm has a value of 1, that is, whether or not the sport mode is selected by the driver as the control mode for the CVT 40 (step S40).

In the case where it is determined in step S40 that the normal mode is selected by the driver as the control mode for the CVT 40 with the mode flag Fm having a value of 0, the speed change ECU 21 sets each of the stepped upshift execution flag Fup and the kickdown flag Fkd to a value of 0 (step S50). Then, the speed change ECU 21 sets a target input rotational speed Nin*, which is a target value for the input rotational speed Nin of the CVT 40 (rotational speed Ne of the engine 12) using a normal mode speed change map (speed change map for continuously variable speed change control) (not illustrated), and sets a target speed ratio γ* Nin*/Nout) for the CVT 40 on the basis of the set target input rotational speed Nin* and the output rotational speed Nout input in step S10 (step S60).

The normal mode speed change map used in step S60 has been prepared in advance so as to prescribe, for each accelerator operation amount, a target input rotational speed Nin* corresponding to the current vehicle speed V at the time when the speed ratio γ of the CVT 40 is steplessly changed in order to improve the fuel efficiency of the automobile 10, and stored in the ROM (not illustrated) of the speed change ECU 21. In step S60, the speed change ECU 21 derives and sets, from the normal mode speed change map, the target input rotational speed Nin* corresponding to the current accelerator operation amount Acc and the current vehicle speed V input in step S10 while performing linear interpolation as appropriate, and sets the target speed ratio γ* for the CVT 40 by dividing the set target input rotational speed Nin* by the output rotational speed Nout.

After the processing in step S60, the speed change ECU 21 controls the first linear solenoid valve such that the primary pulley pressure Pp from the primary pulley pressure control valve of the hydraulic control device 60 is brought to a value that matches the target speed ratio γ* on the basis of a difference between the input rotational speed Nin input in step S10 and the target input rotational speed Nin* or the like (step S150). In step S150, in addition, the speed change ECU 21 controls the second linear solenoid valve on the basis of the estimated engine torque Te or the like such that slip of the belt 46 of the CVT 40 is suppressed by the secondary pulley pressure Ps from the secondary pulley pressure control valve. Then, the speed change ECU 21 executes the processing in and after step S10 again while the accelerator pedal 91 is depressed.

In the case where it is determined in step S40 that the sport mode is selected by the driver as the control mode for the CVT 40 with the mode flag Fm having a value of 1, the speed change ECU 21 determines whether or not it is necessary to execute a stepped upshift (perform a stepwise upshift) in which the speed ratio γ of the CVT 40 is varied stepwise to the upshift side (low speed ratio side) similarly to a stepped automatic transmission in response to an accelerator operation by the driver (whether or not conditions for executing a stepped upshift are met) (step S70). In step S70, the speed change ECU 21 determines: whether or not the current accelerator operation amount Acc is equal to or more than a start threshold As (e.g. about 25%) determined in advance; whether or not the amount of variation ΔAcc in accelerator operation amount is maintained at a value of 0 (or a value around 0) for a determination time (e.g. several tens of milliseconds); and whether or not the current accelerator operation amount Acc is less than an end threshold Ae (e.g. about 20%) determined in advance in the case where the stepped upshift execution flag Fup has a value of 1. In the case where the current accelerator operation amount Acc is equal to or more than the start threshold As and the amount of variation ΔAcc is not maintained at a value of 0 (or a value around 0) for the determination time, and in the case where the stepped upshift execution flag Fup has a value of 1 and the current accelerator operation amount Acc is equal to or more than the end threshold Ae, the speed change ECU 21 determines that it is necessary to execute a stepped upshift (step S80). In the case where such conditions are not met, meanwhile, the speed change ECU 21 determines in step S80 that it is not necessary to execute a stepped upshift.

In the case where it is determined in step S80 that it is not necessary to execute a stepped upshift, the speed change ECU 21 executes the processing in steps S50 and S60 discussed above, thereafter executes hydraulic control on the basis of the target input rotational speed Nin* and the target speed ratio γ* set in step S60 (step S150), and executes the processing in and after step S10 again while the accelerator pedal 91 is depressed. In the case where it is determined in step S80 that it is necessary to execute a stepped upshift, in contrast, the speed change ECU 21 sets the stepped upshift execution flag Fup to a value of 1 (step S90), and executes a target value setting processing in step S100 to set the target input rotational speed Nin* and the target speed ratio γ*. Further, the speed change ECU 21 executes hydraulic control on the basis of the target input rotational speed Nin* and the target speed ratio γ* set in step S100 (step S150), and executes the processing in and after step S10 again while the accelerator pedal 91 is depressed. In the case where it is determined in step S30 that it is necessary to execute a kickdown, meanwhile, the speed change ECU 21 executes a target value setting processing in step S200 to set a target input rotational speed Nin* and a target speed ratio γ*, and executes hydraulic control on the basis of the target input rotational speed Nin* and the target speed ratio γ* set in step S200 (step S150). Also in this case, the speed change ECU 21 executes the processing in and after step S10 again while the accelerator pedal 91 is depressed.

Figure 8:
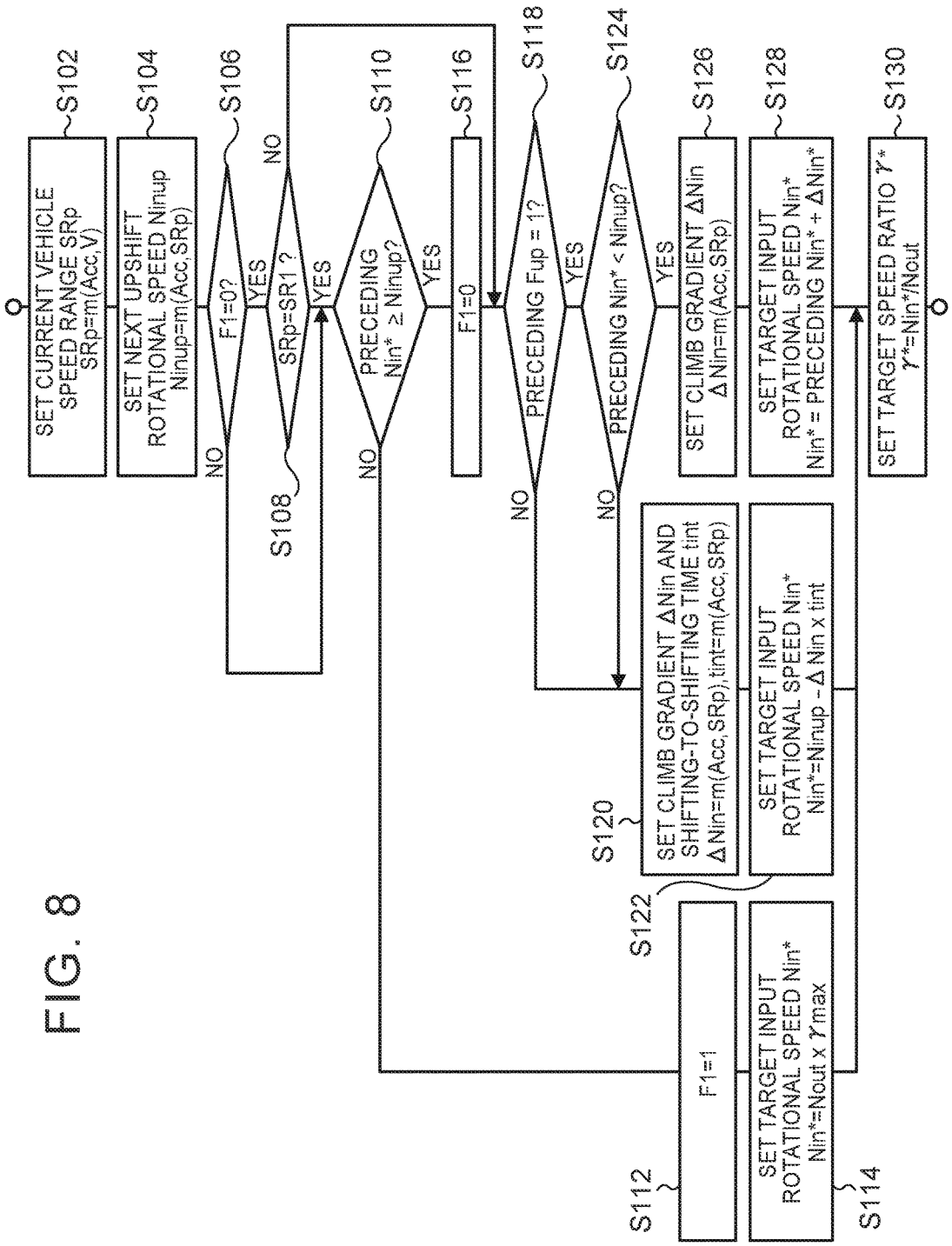
FIG. 8 is a flowchart illustrating an example of target value setting processing performed when a stepped upshift is executed.

FIG. 8 is a flowchart illustrating an example of the target value setting processing performed in step S100 of FIG. 7. As illustrated in the drawing, in the case where it is determined in step S80 that it is necessary to execute a stepped upshift, the speed change ECU 21 sets, as a current vehicle speed range SRp, a vehicle speed range SR that matches the current accelerator operation amount Acc and the current vehicle speed V input in step S10 (step S102). A plurality of vehicle speed ranges SR are determined for each accelerator operation amount by dividing a vehicle speed settable range for each accelerator operation amount (a range in which the vehicle speed is from zero to the maximum vehicle speed that can be achieved with the accelerator operation amount) into a plurality of divisions. In the embodiment, a vehicle speed range setting map (not illustrated) in which a plurality of vehicle speed ranges SR are prescribed for each accelerator operation amount (e.g. for accelerator operation amounts of 100%, 70%, 50%, and 30%) has been prepared in advance, and stored in the ROM (not illustrated) of the speed change ECU 21. In step S102, the speed change ECU 21 sets (acquires), as the current vehicle speed range SRp, a vehicle speed SR, among the plurality of vehicle speed ranges SR from the vehicle speed range setting map, corresponding to the current accelerator operation amount Acc input in step S10 while performing linear interpolation as appropriate.

In the vehicle speed range setting map according to the embodiment, in addition, the number of vehicle speed ranges SR for each accelerator operation amount is determined to be larger as the accelerator operation amount is larger. That is, the vehicle speed range setting map used in step S102 is intended for a widely prevalent continuously variable transmission mounted on a vehicle on which an engine with a displacement of about 1.5 L to 3.0 L is mounted, for example, and in consideration of the performance of the vehicle (such as the maximum vehicle speed Vmax and acceleration performance), the characteristics of the engine, and so forth, the number of vehicle speed ranges SR (the number of divisions of the vehicle speed settable range, that is, the number of allowable stepwise upshifts) at the time when the accelerator operation amount is maximum (100%) is "16" (16 steps from SR1 to SR16), for example; the number of vehicle speed ranges SR at the time when the accelerator operation amount is 70% is "12" (12 steps from SR1 to SR12), for example; the number of vehicle speed ranges SR at the time when the accelerator operation amount is 50% is "9" (nine steps from SR1 to SR9), for example; and the number of vehicle speed ranges SR at the time when the accelerator operation amount is 30% is "6" (six steps from SR1 to SR6), for example. Consequently, also in the second embodiment, the number of allowable stepwise upshifts is larger as the accelerator operation amount Acc achieved by the driver of the automobile 10 is larger in the case where the accelerator operation amount Acc is constant.

After the current vehicle speed range SRp which matches the current accelerator operation amount Acc and the current vehicle speed V is set, the speed change ECU 21 sets a next upshift rotational speed Ninup, which is a target value for the input rotational speed Nin at the time when the speed ratio γ of the CVT 40 is varied stepwise to the upshift side the next time, on the basis of the current accelerator operation amount Acc input in step S10 and the current vehicle speed range SRp set in step S102 (step S104). In the embodiment, a next upshift rotational speed setting map (not illustrated) in which the next upshift rotational speed Ninup in the plurality of vehicle speed ranges SR is prescribed for each accelerator operation amount (e.g. for accelerator operation amounts of 100%, 70%, 50%, and 30%) has been prepared in advance, and stored in the ROM (not illustrated) of the speed change ECU 21. In the next upshift rotational speed setting map, the next upshift rotational speed Ninup (a constant value) determined in consideration of the speed ratio, the vehicle speed, and so forth assumed in the vehicle speed SR is assigned to each vehicle speed range SR for each accelerator operation amount. In the embodiment, the next upshift rotational speed setting map is prepared in consideration of torque characteristics of the engine etc. such that a higher next upshift rotational speed Ninup is prescribed as the accelerator operation amount is larger. In step S104, the speed change ECU 21 derives and sets the next upshift rotational speed Ninup corresponding to the current accelerator operation amount Acc and the current vehicle speed range SRp from the next upshift rotational speed setting map while performing linear interpolation as appropriate.

Subsequently, the speed change ECU 21 determines whether or not the first speed flag F1 has a value of 0 (step S106). The first speed flag F1 is set to a value of 0 in the case where a stepped upshift or a kickdown is not executed and in the case where the current vehicle speed range SRp is not the lowest vehicle speed range SR1. Thus, when execution of a stepped upshift is started, a positive judgment (a determination of F1=0) is made in step S106. When it is determined in step S106 that the first speed flag F1 has a value of 0, the speed change ECU 21 determines whether or not the current vehicle speed range SRp is the lowest vehicle speed range SR1 (irrespective of the current accelerator operation amount Acc) (step S108). In the case where it is determined that the current vehicle speed range SRp is the lowest vehicle speed range SR1, the speed change ECU 21 determines whether or not the target input rotational speed Nin* (preceding value) set at the time of the preceding execution of the routine is equal to or more than the next upshift rotational speed Ninup set in step S104 (whether the target input rotational speed Nin* has reached the next upshift rotational speed Ninup) (step S110). In the case where the preceding value of the target input rotational speed Nin* is less than the next upshift rotational speed Ninup, the first speed flag F1 is set to a value of 1 in step S112 (step S112), and the speed change ECU 21 sets the current target input rotational speed Nin* to a value obtained by multiplying the output rotational speed Nout input in step S10 by a maximum speed ratio γmax of the CVT 40 (step S114). Further, the speed change ECU 21 sets the target speed ratio γ* for the CVT 40 by dividing the set target input rotational speed Nin* by the output rotational speed Nout input in step S10 (step S130), executes hydraulic control in step S150, and executes the processing in and after step S10 again while the accelerator pedal 91 is depressed.

Also in the case where the target value setting processing in step S100 is executed after the target input rotational speed Nin* is set in step S114, the speed change ECU 21 sets the current vehicle speed range SRp and the next upshift rotational speed Ninup which match the current accelerator operation amount Acc and the current vehicle speed V as discussed above (steps S102 and S104), and executes the determination processing in step S106. As discussed above, in the case where the target input rotational speed Nin* is set in step S114, the first speed flag F1 is set to a value of 1 in step S112. Thus, in this case, the speed change ECU 21 determines in step S106 that the first speed flag F1 has a value of 1, skips the processing in step S108, and determines whether or not the preceding value of the target input rotational speed Nin* is equal to or more than the next upshift rotational speed Ninup (step S110). Then, when it is determined that the preceding value of the target input rotational speed Nin* is less than the next upshift rotational speed Ninup, the speed change ECU 21 sets the target input rotational speed Nin* for the CVT 40 on the basis of the maximum speed ratio γmax and the output rotational speed Nout of the CVT 40 in step S114 as discussed above.

Figure 9A:
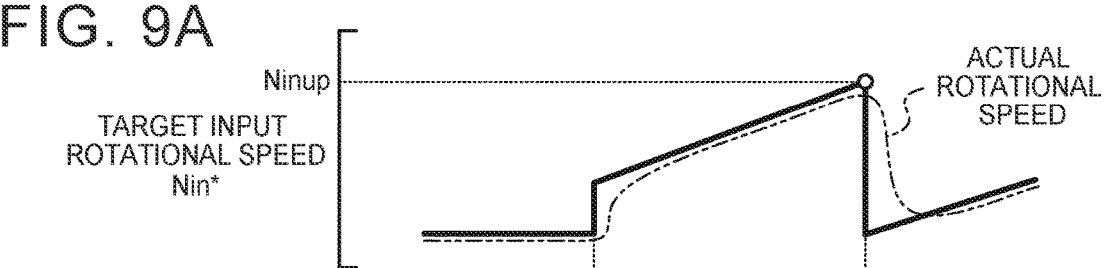
FIGS. 9A, 9B, and 9C are each a time chart illustrating an example of how the target input rotational speed, the current vehicle speed range, and the value of a first speed flag vary, respectively, when a stepped upshift is executed.
Figure 9B:
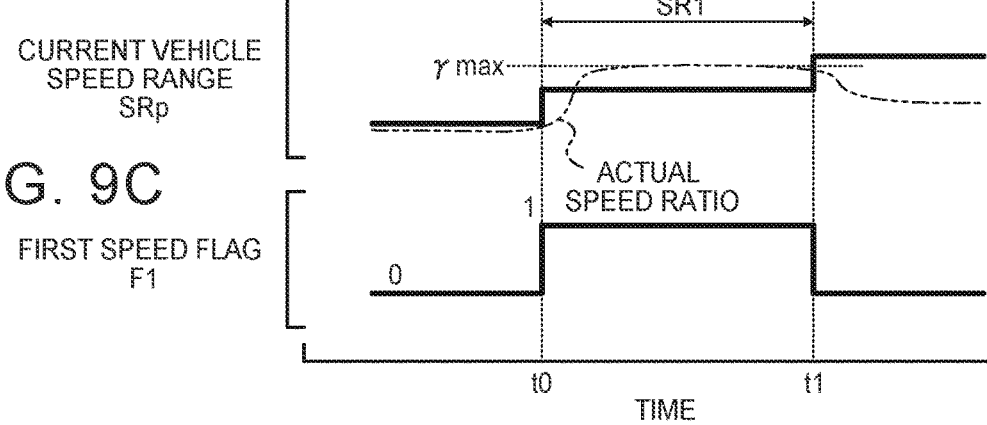
Figure 9C:
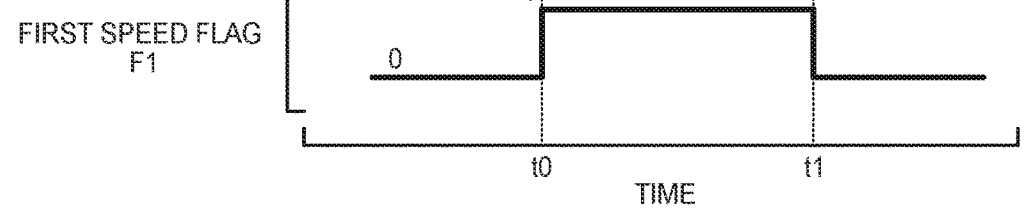
Figure 10A:
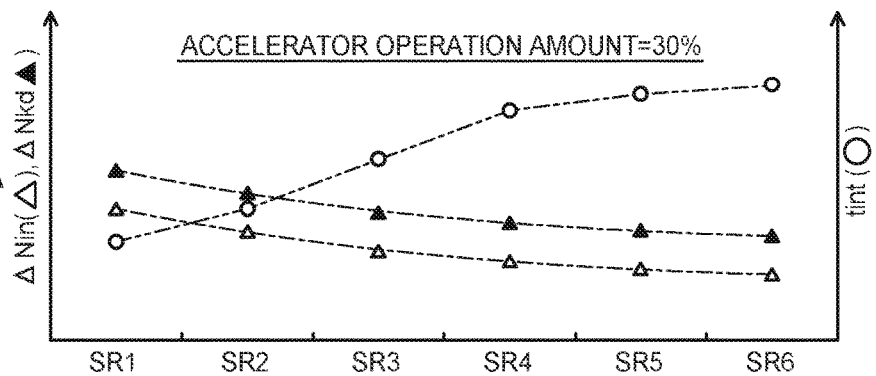
FIGS. 10A, 10B, 10C, and 10D each illustrate an example of a climb gradient setting map, a kickdown gradient setting map, and a shifting-to-shifting time setting map.
Figure 10B:
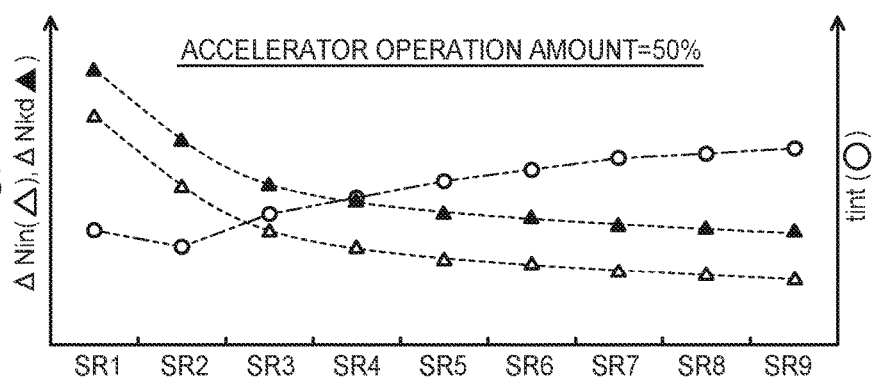
Figure 10C:
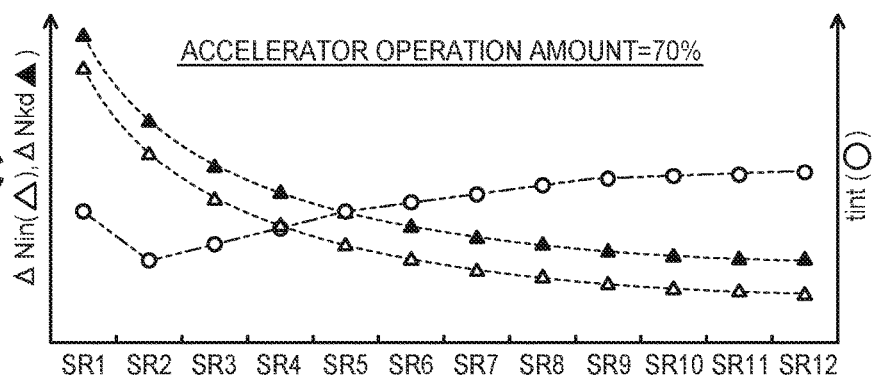
Figure 10D:
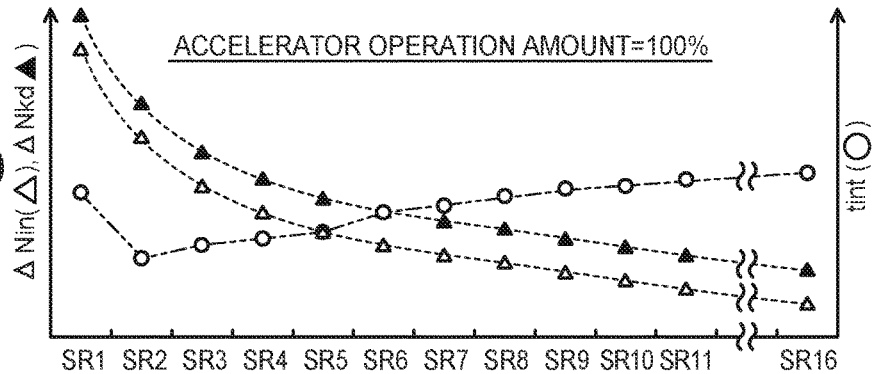

As a result, in the case where the automobile 10 is started with the sport mode selected by the driver, or in the case where the sport mode is selected by the driver when the current vehicle speed V is included in the lowest vehicle speed range SR1, as illustrated in FIGS. 9A, 9B, and 9C, the target input rotational speed Nin* for the CVT 40 is set on the basis of the maximum speed ratio γmax and the output rotational speed Nout during a period from the time when the vehicle is started or immediately after the sport mode is selected (time t0 in FIGS. 9A to 9C) until it is determined in step S110 that the preceding value of the target input rotational speed Nin* has become equal to or more than (has reached) the next upshift rotational speed Ninup (time t1 in FIGS. 9A to 9C) (step S114). In this way, it is possible to favorably secure the acceleration performance of the automobile 10 in the lowest vehicle speed range SR1 by setting the target input rotational speed Nin* using a fixed speed ratio, that is, the maximum speed ratio γmax, until the target input rotational speed Nin* reaches the next upshift rotational speed Ninup in the case where the current vehicle speed range SRp is the lowest vehicle speed range SR1.

In the case where it is determined in step S110 that the preceding value of the target input rotational speed Nin* is equal to or more than the next upshift rotational speed Ninup after the target input rotational speed Nin* is set in step S114, the speed change ECU 21 sets the first speed flag F1 to a value of 0 (step S116), and determines, on the basis of the value (preceding value) of the stepped upshift execution flag Fup at the time of the preceding execution of the routine, whether or not it is the time to start execution of a stepped upshift (the first cycle after it is determined that it is necessary to execute a stepped upshift) (step S118). In addition, in the case where the target value setting processing in step S100 is executed, it is determined in step S106 that the first speed flag F1 has a value of 0, and it is determined in step S108 that the current vehicle speed range SRp is not the lowest vehicle speed range SR1, the speed change ECU 21 determines, on the basis of the preceding value of the stepped upshift execution flag Fup, whether or not it is the time to start execution of a stepped upshift (step S118).

In the case where it is determined in step S118 that the preceding value of the stepped upshift execution flag Fup is 0 and it is the time to start execution of a stepped upshift, the speed change ECU 21 sets a climb gradient ΔNin on the basis of the current accelerator operation amount Acc input in step S10 and the current vehicle speed range SRp set in step S102, and sets a shifting-to-shifting time tint on the basis of the current accelerator operation amount Acc and the current vehicle speed range SRp (step S120). The climb gradient ΔNin prescribes the amount of variation (a positive value) in input rotational speed Nin per execution interval (time interval dt) of the routine after the start of stepwise variation in speed ratio γ of the CVT 40 to the upshift side (low speed ratio side). The shifting-to-shifting time tint prescribes an approximate time interval from the start of stepwise variation in speed ratio γ of the CVT 40 to the upshift side until the speed ratio γ is varied stepwise to the upshift side the next time.

In the embodiment, a climb gradient setting map in which the climb gradient ΔNin in the plurality of vehicle speed ranges SR is prescribed for each accelerator operation amount (e.g. for accelerator operation amounts of 100%, 70%, 50%, and 30%) has been prepared in advance, a shifting-to-shifting time setting map in which the shifting-to-shifting time tint in the plurality of vehicle speed ranges SR is prescribed for each accelerator operation amount (e.g. for accelerator operation amounts of 100%, 70%, 50%, and 30%) has been prepared in advance, and the two maps are stored in the ROM (not illustrated) of the speed change ECU 21. In the climb gradient setting map according to the embodiment, the climb gradient ΔNin which is determined through experiments and analyses is assigned to each of the vehicle speed ranges SR for each accelerator operation amount. The climb gradient setting map is prepared such that, as illustrated in FIGS. 10A, 10B, 10C, and 10D, the climb gradient ΔNin becomes larger as the accelerator operation amount becomes larger and becomes smaller as the vehicle speed range SR transitions toward the high speed side (see the white triangular symbols in FIGS. 10A to 10D). In the shifting-to-shifting time setting map according to the embodiment, meanwhile, the shifting-to-shifting time tint which is determined through experiments and analyses is assigned to each of the vehicle speed ranges SR for each accelerator operation amount. The shifting-to-shifting time setting map is prepared such that, as illustrated in FIGS. 10A to 10D, the shifting-to-shifting time tint becomes shorter as the accelerator operation amount becomes larger and becomes longer as the vehicle speed SR transitions toward the high speed side excluding the lowest vehicle speed range SR1.

In step S120, the speed change ECU 21 derives and sets the climb gradient ΔNin corresponding to the current accelerator operation amount Acc and the current vehicle speed range SRp from the climb gradient setting map while performing linear interpolation as appropriate, and derives and sets the shifting-to-shifting time tint corresponding to the current accelerator operation amount Acc and the current vehicle speed range SRp from the shifting-to-shifting time setting map while performing linear interpolation as appropriate. Then, the speed change ECU 21 sets the current target input rotational speed Nin* to a value obtained by subtracting the product of the climb gradient ΔNin and the shiftingto-shifting time tint from the next upshift rotational speed Ninup set in step S104 (step S122). In this way, by setting the target input rotational speed Nin* on the basis of the next upshift rotational speed Ninup, the climb gradient ΔNin, and the shifting-to-shifting time tint in step S122, the target input rotational speed Nin* can be made lower than the input rotational speed Nin (current input rotational speed) at the time point. Further, the speed change ECU 21 sets the target speed ratio γ* for the CVT 40 by dividing the set target input rotational speed Nin* by the output rotational speed Nout input in step S10 (step S130), executes hydraulic control in step S150, and executes the processing in and after step S10 again while the accelerator pedal 91 is depressed.

Also in the case where the target value setting processing in step S100 is executed after the target input rotational speed Nin* is set in step S122, the speed change ECU 21 sets the current vehicle speed range SRp and the next upshift rotational speed Ninup which match the current accelerator operation amount Acc and the current vehicle speed V as discussed above (steps S102 and S104), and executes the processing in and after step S106. In this case, it is not immediately after the start of execution of a stepped upshift, and the current vehicle speed range SRp is not the lowest vehicle speed range SR1. Thus, the speed change ECU 21 executes the determination processing in steps S106, S108, and S118, and thereafter determines whether or not the preceding value of the target input rotational speed Nin* is less than the next upshift rotational speed Ninup set in step S104 (whether the target input rotational speed Nin* has reached the next upshift rotational speed Ninup) (step S124).

In the case where it is determined in step S124 that the preceding value of the target input rotational speed Nin* is less than the next upshift rotational speed Ninup, the speed change ECU 21 derives and sets the climb gradient ΔNin corresponding to the current accelerator operation amount Acc input in step S10 and the current vehicle speed range SRp set in step S102 from the climb gradient setting map discussed above (step S126) as in step S120. Then, the speed change ECU 21 sets the current target input rotational speed Nin* to the sum of the preceding value of the target input rotational speed Nin* and the climb gradient ΔNin set in step S126 (step S128), and sets the target speed ratio γ* for the CVT 40 by dividing the set target input rotational speed Nin* by the output rotational speed Nout input in step S10 (step S130). Further, the speed change ECU 21 executes hydraulic control in step S150, and executes the processing in and after step S10 again while the accelerator pedal 91 is depressed.

Also in the case where the target value setting processing in step S100 is executed after the target input rotational speed Nin* is set in step S128, the speed change ECU 21 executes the processing in steps S102, S104, S106, S108, and S118, and determines whether or not the preceding value of the target input rotational speed Nin* is less than the next upshift rotational speed Ninup (step S124). In the case where it is determined in step S124 that the preceding value of the target input rotational speed Nin* is less than the next upshift rotational speed Ninup, the speed change ECU 21 sets the climb gradient ΔNin corresponding to the current accelerator operation amount Acc and the current vehicle speed range SRp (step S126), and sets the current target input rotational speed Nin* to the sum of the preceding value of the target input rotational speed Nin* and the climb gradient ΔNin (step S128). In the case where it is determined in step S124 that the preceding value of the target input rotational speed Nin* is equal to or more than the next upshift rotational speed Ninup set in step S104 after the processing in steps S102, S104, S106, S108, and S118 are executed, the speed change ECU 21 executes the processing in and after step S120 discussed above. Then, the speed change ECU 21 repeatedly executes the processing in and after step S10 discussed above while the accelerator pedal 91 is depressed.

As a result, as illustrated in FIGS. 11A and 11B, after the target input rotational speed Nin* is set to a value obtained by subtracting the product of the climb gradient ΔNin and the shifting-to-shifting time tint from the next upshift rotational speed Ninup in step S122 (time t10 in FIGS. 11A and 11B), the target input rotational speed Nin* is set to the sum of the preceding value of the target input rotational speed Nin* and the climb gradient ΔNin which matches the current accelerator operation amount Acc and the current vehicle speed range SRp for each time interval dt in step S128 until it is determined in step S124 that the preceding value of the target input rotational speed Nin* has become equal to or more than (has reached) the next upshift rotational speed Ninup set in step S104 (time t11 in FIGS. 11A and 11B). Consequently, it is possible to vary the speed ratio γ stepwise to the upshift side by lowering the input rotational speed Nin of the CVT 40 relatively steeply, and to make the speed ratio γ higher in accordance with the climb gradient ΔNin which matches the current accelerator operation amount Acc and the current vehicle speed range SRp, as indicated by the dash-double-dot lines in FIGS. 11A and 11B.

As discussed above, in executing a stepped upshift, the speed change ECU 21 which serves as the control device for the CVT 40 acquires, for each time interval dt determined in advance, the current vehicle speed range SRp which matches the current accelerator operation amount Acc and the current vehicle speed V, that is, one of the plurality of vehicle speed ranges SR matching the current accelerator operation amount Ace that includes the current vehicle speed V, from the plurality of vehicle speed ranges SR (vehicle speed range setting map) determined by dividing a vehicle speed settable range for each accelerator operation amount into a plurality of divisions (step S102). In addition, the speed change ECU 21 sets, on the basis of at least the current accelerator operation amount Acc, the next upshift rotational speed Ninup, which is the target value for the input rotational speed Nin to be achieved when the speed ratio γ is varied stepwise to the upshift side the next time, for each time interval dt (step S104). Further, at the timing when the speed ratio γ is varied stepwise to the upshift side, the speed change ECU 21 sets the target input rotational speed Nin* to be lower than the input rotational speed Nin (current input rotational speed) at the time point (step S122). Then, the speed change ECU 21 sets the target input rotational speed Nin* in step S122, acquires, for each time interval dt, the climb gradient ΔNin which matches the current accelerator operation amount Acc and the current vehicle speed range SRp from the climb gradient ΔNin (climb gradient setting map) of the input rotational speed Nin determined for each of the plurality of vehicle speed ranges SR for each accelerator operation amount (step S126), and sets, for each time interval dt, the target input rotational speed Nin* such that the input rotational speed Nin is varied in accordance with the climb gradient ΔNin which matches the current accelerator operation amount Acc and the current vehicle speed range SRp until the target input rotational speed Nin* (preceding value) reaches the next upshift rotational speed Ninup (step S128).

That is, the speed change ECU 21 sets the target input rotational speed Nin* such that the input rotational speed Nin of the CVT 40 becomes lower than the current input rotational speed, and thereafter sets the target input rotational speed Nin* such that the input rotational speed Nin is increased in accordance with the climb gradient ΔNin which matches the current accelerator operation amount Acc and the current vehicle speed range SRp. Consequently, it is possible to lower the input rotational speed Nin to vary the speed ratio γ of the CVT 40 stepwise to the upshift side, and to make the input rotational speed Nin higher in accordance with the climb gradient ΔNin which is constant and matches the current accelerator operation amount Acc and the current vehicle speed range SRp in the case where the current vehicle speed range SRp is not varied with the driver achieving a generally constant accelerator operation amount. Thus, in such a case, the speed ratio γ can be varied stepwise to the upshift side at the time point (time t11 in FIGS. 11A and 11B) when the shifting-to-shifting time tint has elapsed since the timing (time t10 in FIGS. 11A and 11B) to start stepwise variations in speed ratio γ to the upshift side. Even if the accelerator operation amount or the current vehicle speed range SRp (current vehicle speed V) is varied after the start of stepwise variation in speed ratio γ to the upshift side, meanwhile, it is possible to change the climb gradient ΔNin so as to match the current accelerator operation amount Acc and the current vehicle speed range SRp, and to make the input rotational speed Nin accordingly higher, as indicated by the broken lines in FIGS. 11A and 11B.

As a result, it is possible to improve the direct acceleration feel, that is, the sense of directness, to be felt by the driver by allowing the driver to feel that (direct) acceleration that matches his/her intention of acceleration has been obtained after the speed ratio γ of the CVT 40 is varied stepwise to the upshift side. Thus, it is possible to improve the acceleration feel and the drivability of the automobile 10 on which the CVT 40 is mounted. In the embodiment, the target input rotational speed Nin* is set such that the input rotational speed Nin becomes higher in accordance with the climb gradient ΔNin which matches the current accelerator operation amount Acc and the current vehicle speed range SRp in and after the cycle next to the cycle in which the target input rotational speed Nin* is set in step S122. However, the present disclosure is not limited thereto. That is, the target input rotational speed Nin* may be set such that the target input rotational speed Nin* is kept low after the target input rotational speed Nin* is set in step S122, and such that the input rotational speed Nin* is increased in accordance with the climb gradient ΔNin after the input rotational speed Nin is lowered to a certain degree.

In addition, the speed change ECU 21 acquires the shifting-to-shifting time tint which matches the current accelerator operation amount Acc and the current vehicle speed range SRp from a plurality of shifting-to-shifting times tint (shifting-to-shifting time setting map) determined for each of the plurality of vehicle speed ranges SR for each accelerator operation amount as the time from the timing when the speed ratio γ is varied stepwise to the upshift side until the speed ratio γ is varied stepwise to the upshift side the next time (step S120). Then, at the timing when the speed ratio γ is varied stepwise to the upshift side, the speed change ECU 21 sets the target input rotational speed Nin* on the basis of the next upshift rotational speed Ninup set in step S104 and the climb gradient ΔNin and the shifting-to-shifting time tint acquired in step S120 (step S122). Consequently, it is possible to lower, at the timing when the speed ratio γ is varied stepwise to the upshift side, the input rotational speed Nin by an amount matching the climb gradient ΔNin, which is used to make the input rotational speed Nin higher thereafter, to vary the speed ratio γ stepwise to the upshift side the next time at a more adequate timing that matches the intention of acceleration of the driver.

Further, in the case where the current vehicle speed range SRp is the lowest vehicle speed range SR1, the speed change ECU 21 sets the target input rotational speed Nin* on the basis of the maximum speed ratio γmax, which is a fixed speed ratio determined in advance, and the output rotational speed Nout of the CVT 40 until the target input rotational speed Nin* (preceding value) reaches the next upshift rotational speed Ninup (step S114). In this way, it is possible to favorably secure the acceleration performance of the automobile 10 in the lowest vehicle speed range SR1 by setting the target input rotational speed Nin* using the maximum speed ratio γmax until the target input rotational speed Nin* reaches the next upshift rotational speed Ninup in the case where the current vehicle speed range SRp is the lowest vehicle speed range SR1.

It should be noted, however, that the fixed speed ratio used in step S114 is not limited to the maximum speed ratio γmax of the CVT 40. In the case where the number of vehicle speed ranges SR for each accelerator operation amount is larger than that discussed above, the target input rotational speed Nin* may be set using a fixed speed ratio in the case where the current vehicle speed range SRp is a vehicle speed range SR on the low vehicle speed side such as the second vehicle speed range SR2 and the third vehicle speed range SR3. Further, the target input rotational speed Nin* may be set using a fixed speed ratio in the case where the current vehicle speed range SRp is a vehicle speed range SR on the high speed side (such as SR16, for example). Consequently, it is possible to suppress occurrence of the so-called sense of busyness along with stepwise variations in input rotational speed Nin by suppressing fluctuations in input rotational speed Nin at the timing when the speed ratio γ is varied to the upshift side during travel in the vehicle speed range on the high speed side.

In the embodiment, in addition, the number of vehicle speed ranges SR for each accelerator operation amount is determined to be larger as the accelerator operation amount is larger. In this way, by increasing the number of change steps of the speed ratio γ as the accelerator operation amount achieved by the driver is larger, that is, by increasing the number of allowable stepwise upshifts as the accelerator operation amount Acc achieved by the driver of the automobile 10 is larger in the case where the accelerator operation amount Acc is constant, it is possible to make the interval at which the speed ratio γ is varied stepwise to the upshift side (shifting-to-shifting time tint) and fluctuations in engine sound more adequate so as to match the intention of acceleration of the driver, and to improve an atmospheric acceleration feel, that is, a sense of rhythm, to be felt by the driver. It should be noted, however, that also in the second embodiment, the number of vehicle speed ranges SR for each accelerator operation amount is not limited thereto. That is, according to the studies by the inventors, it has been revealed that the drivability of a diversity of automobiles that are available in the market can be improved by determining the number of vehicle speed ranges SR (maximum number of steps) at the time when the accelerator operation amount Acc is maximum (100%) as a value within the range of 12 steps to 48 steps, more preferably within the range of 16 steps to 36 steps. In this case, in the light of the fact that the number of shift speeds of widely prevalent continuously variable transmissions is four steps, six steps, or eight steps, the number of change steps (maximum number of steps) at the time when the accelerator operation amount Acc is maximum (100%) is preferably a common multiple of all or any two of the values of four, six, and eight.

In the embodiment, further, the climb gradient ΔNin is determined to become larger as the accelerator operation amount becomes larger, and to become smaller as the vehicle speed range SR transitions toward the high speed side. That is, it can be considered that the driver generally has a high intention of acceleration in the case where the accelerator operation amount is large, and that the driver has a higher intention of acceleration in the case where the accelerator operation amount is large and the vehicle speed is low. Further, it can be considered that the driver generally has a low intention of acceleration in the case where the vehicle speed is high, and that the driver has a lower intention of acceleration in the case where the current vehicle speed V is low and the accelerator operation amount is small. Thus, if the climb gradient ΔNin of the input rotational speed Nin is determined to become larger as the accelerator operation amount becomes larger, and to become smaller as the vehicle speed range SR transitions toward the high speed side, it is possible to improve the acceleration feel, that is, the sense of directness and the sense of rhythm, by increasing the climb gradient ΔNin as the intention of acceleration of the driver is higher, and to suppress occurrence of the sense of busyness by making the climb gradient ΔNin smaller as the intention of acceleration of the driver is lower.

In the embodiment, in addition, the shifting-to-shifting time tint is determined to become shorter as the accelerator operation amount becomes (is) larger, and to become longer as the vehicle speed range SR transitions toward the high speed side excluding a case where the current vehicle speed range SRp is the lowest vehicle speed range SR1. In this way, by making the shifting-to-shifting time tint, that is, the interval at which the speed ratio γ is varied stepwise to the upshift side (execution interval between stepwise upshifts), shorter as the accelerator operation amount becomes larger, an atmospheric acceleration feel, that is, a sense of rhythm, to be felt by the driver can be improved in the case where the accelerator operation amount Acc is large and the intention of acceleration of the driver is high. As a result, also in the second embodiment, it is possible to improve the drivability of the automobile 10 on which the CVT 40 is mounted. Then, by making the shifting-to-shifting time tint longer as the vehicle speed range SR transitions toward the high speed side excluding a case where the current vehicle speed range SRp is the lowest vehicle speed range SR1, it is possible to suppress impairment of the sense of rhythm, and hence occurrence of the sense of busyness, by suppressing frequent fluctuations in engine sound of the automobile 10 or the like in the case where the intention of acceleration of the driver is low.

Further, if the shifting interval time tint is made shorter as the accelerator operation amount Acc is larger and the shifting interval time tint is made longer as the vehicle speed range SR transitions toward the high speed side (excluding the lowest vehicle speed range SR1), the execution interval (shifting-to-shifting time tint) between stepwise upshifts becomes longer as the number of executions of stepwise upshifts is increased when the automobile 10 is accelerating in response to depression of the accelerator pedal 91. Consequently, it is possible to make fluctuations in engine sound more adequate so as to match the intention of acceleration of the driver, and to suppress impairment of the sense of rhythm, that is, occurrence of the so-called sense of busyness, during acceleration of the automobile 10. Thus, it is possible to improve the drivability of the automobile 10 on which the CVT 40 is mounted by improving the sense of rhythm obtained when stepwise upshifts are made.

In the embodiment, in addition, the mode select switch 100, which allows the driver to select one of the normal mode (continuously variable speed change mode), in which the speed ratio γ is steplessly changeable, and the sport mode (stepped speed change mode), in which the speed ratio γ is changeable stepwise, is connected to the speed change ECU 21, and the speed change ECU 21 changes the speed ratio γ stepwise when the sport mode is selected by the driver. Consequently, it is possible to improve the drivability of the automobile 10 by changing the speed ratio γ stepwise in the sport mode, and to improve the fuel efficiency of the automobile 10 by steplessly changing the speed ratio γ in the normal mode.

Figure 12:
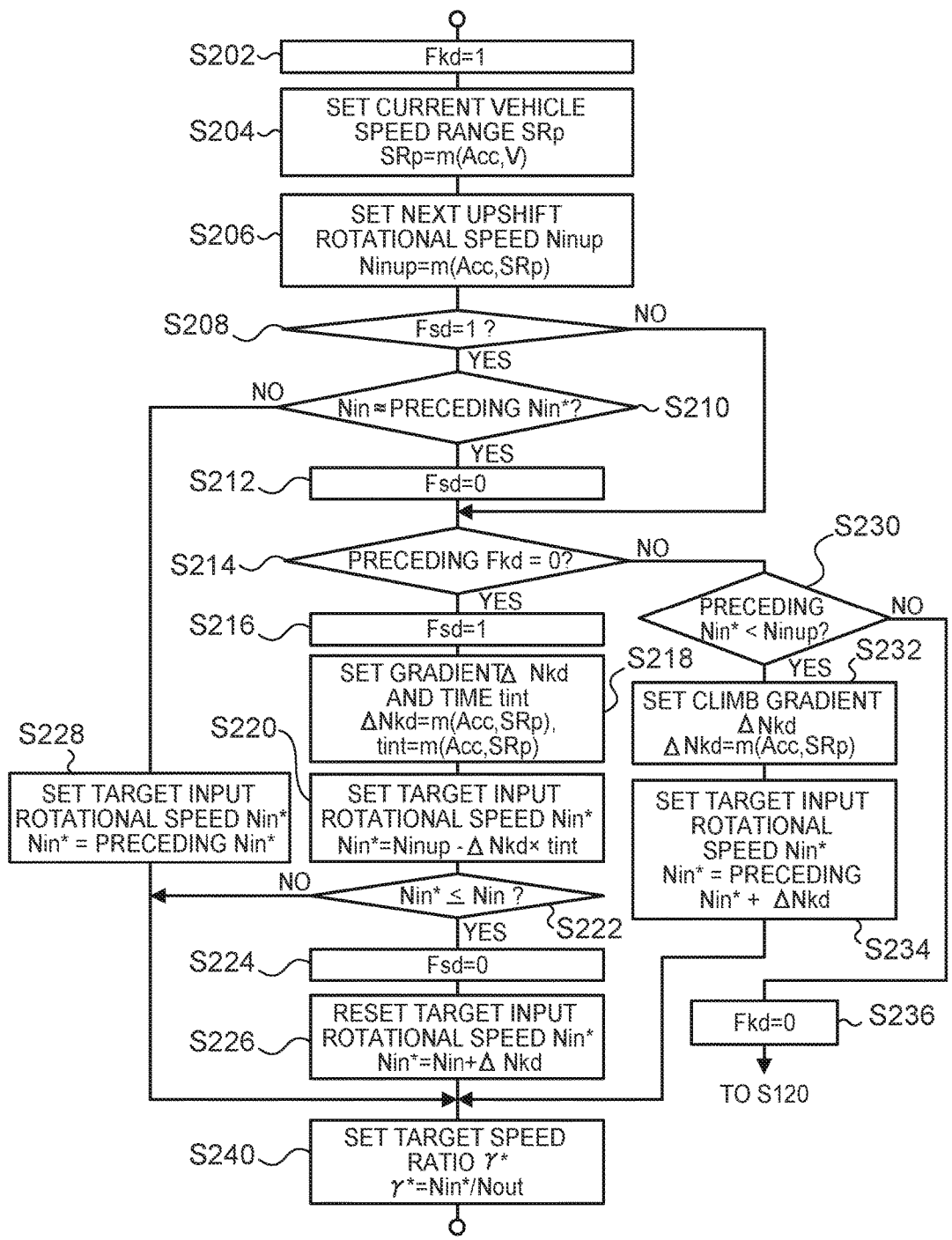
FIG. 12 is a flowchart illustrating an example of target value setting processing performed when a kickdown is executed.

Subsequently, the target value setting processing performed when a kickdown is executed in response to a kickdown operation by the driver of the automobile 10 will be described. FIG. 12 is a flowchart illustrating an example of the target value setting processing performed in step S200 executed in the case where it is determined in step S30 of FIG. 7 that it is necessary to execute a kickdown.

As illustrated in FIG. 12, in the case where it is determined in step S30 that it is necessary to execute a kickdown, the speed change ECU 21 sets the kickdown flag Fkd to a value of 1 (step S202), acquires a vehicle speed range SR that matches the current accelerator operation amount Acc and the current vehicle speed V input in step S10 from the vehicle speed range setting map discussed above (step S204), and further derives and sets the next upshift rotational speed Ninup corresponding to the current accelerator operation amount Acc and the current vehicle speed range SRp from the next upshift rotational speed setting map discussed above (step S206).

Subsequently, the speed change ECU 21 determines whether or not the step-down flag Fsd has a value of 1 (step S208). The step-down flag Fsd is set to a value of 0 in the case where a kickdown is not executed. Thus, when execution of a kickdown is started, a negative judgment (a determination of Fsd=0) is made in step S208. If it is determined in step S208 that the step-down flag Fsd has a value of 0, the speed change ECU 21 determines, on the basis of the value (preceding value) of the kickdown flag Fkd at the time of the preceding execution of the routine, whether or not it is the time to start execution of a kickdown (step S214). In the case where it is determined in step S214 that the preceding value of the kickdown flag Fkd is a value of 0, the speed change ECU 21 sets the step-down flag Fsd to a value of 1 (step S216).

After the step-down flag Fsd is set to a value of 1 in step S216, the speed change ECU 21 sets a climb gradient ΔNkd on the basis of the current accelerator operation amount Acc input in step S10 and the current vehicle speed range SRp set in step S204, and sets the shifting-to-shifting time tint on the basis of the current accelerator operation amount Acc and the current vehicle speed range SRp (step S218). The climb gradient ΔNkd prescribes the amount of variation (a positive value) in input rotational speed Nin per execution interval (time interval dt) of the routine at the time when the speed ratio γ is varied to the downshift side (high speed ratio side) in response to a kickdown operation. Meanwhile, the shifting-to-shifting time tint basically prescribes an approximate time interval after the speed ratio γ of the CVT 40 is varied stepwise to the downshift side until the speed ratio γ is varied stepwise to the upshift side the next time.

In the embodiment, a kickdown gradient setting map in which the climb gradient ΔNkd in a plurality of vehicle speed ranges SR is prescribed for each accelerator operation amount (e.g. for accelerator operation amounts of 100%, 70%, 50%, and 30%) has been prepared in advance, and stored in the ROM (not illustrated) of the speed change ECU 21. In the kickdown gradient setting map according to the embodiment, the climb gradient ΔNkd which is determined through experiments and analyses is assigned to each of the vehicle speed ranges SR for each accelerator operation amount. The kickdown gradient setting map is prepared such that, as illustrated in FIGS. 10A to 10D, the climb gradient ΔNkd becomes larger as the accelerator operation amount becomes larger and becomes smaller as the vehicle speed range SR transitions toward the high speed side (see the black triangular symbols in FIGS. 10A to 10D). In addition, as seen from FIGS. 10A to 10D, the kickdown gradient setting map is prepared such that the climb gradient ΔNkd in each of the vehicle speed ranges SR for each accelerator operation amount is prescribed to be larger than the climb gradient ΔNin corresponding to the same (combination of) accelerator operation amount and vehicle speed range SR acquired from the climb gradient setting map used in steps S120 and S126 discussed above.

In step S218, the speed change ECU 21 derives and sets the climb gradient ΔNkd corresponding to the current accelerator operation amount Acc and the current vehicle speed range SRp from the kickdown gradient setting map while performing linear interpolation as appropriate, and derives and sets the shifting-to-shifting time tint corresponding to the current accelerator operation amount Acc and the current vehicle speed range SRp from the shifting-to-shifting time setting map used in steps S120 and S126 discussed above while performing linear interpolation as appropriate. It should be noted, however, that a dedicated kickdown shifting-to-shifting time setting map prepared to prescribe the shifting-to-shifting time tint at the time of execution of a kickdown may be used in step S218. Then, the speed change ECU 21 sets the current target input rotational speed Nin* to a value obtained by subtracting the product of the climb gradient ΔNkd and the shifting-to-shifting time tint from the next upshift rotational speed Ninup set in step S206 (step S220).

After the target input rotational speed Nin* is temporarily set in step S220, the speed change ECU 21 determines whether or not the set target input rotational speed Nin* is equal to or less than the input rotational speed Nin input in step S10 (step S222). In the case where it is determined that the target input rotational speed Nin* exceeds the input rotational speed Nin, the speed change ECU 21 sets the target speed ratio γ* for the CVT 40 by dividing the target input rotational speed Nin* set in step S220 by the output rotational speed Nout input in step S10 (step S240), executes hydraulic control in step S150, and executes the processing in and after step S10 again while the accelerator pedal 91 is depressed.

In the case where it is determined in step S222 that the target input rotational speed Nin* is equal to or less than the input rotational speed Nin, in contrast, the speed change ECU 21 sets the step-down flag Fsd to a value of 0 (step S224), and resets the target input rotational speed Nin* to the sum of the input rotational speed Nin input in step S10 and the climb gradient ΔNkd set in step S218 (step S226). Consequently, when a kickdown operation is performed, it is possible to make the target input rotational speed Nin* higher than the input rotational speed Nin (current input rotational speed) at the time point, and to reliably suppress a phenomenon that the speed ratio γ is not varied to the downshift side. In the case where the target input rotational speed Nin* is reset in step S226, the speed change ECU 21 sets the target speed ratio γ* for the CVT 40 (step S240), executes hydraulic control in step S150, and executes the processing in and after step S10 again while the accelerator pedal 91 is depressed.

Also in the case where the target value setting processing in step S200 is executed after the target input rotational speed Nin* is set in step S220, the speed change ECU 21 executes the processing in steps S202, S204, and S206 discussed above, and determines in step S208 whether or not the step-down flag Fsd has a value of 1. In the case where it is determined in step S222 discussed above that the target input rotational speed Nin* exceeds the input rotational speed Nin, the step-down flag Fsd is maintained at a value of 1, and thus the speed change ECU 21 determines in step S208 that the step-down flag Fsd has a value of 1. Then, the speed change ECU 21 determines whether or not the input rotational speed Nin of the CVT 40 input in step S10 generally coincides with the preceding value of the target input rotational speed Nin* (is included within a relatively narrow range with the preceding value as a center) (step S210).

In the case where it is determined in step S210 that the input rotational speed Nin of the CVT 40 does not generally coincide with the preceding value of the target input rotational speed Nin*, the speed change ECU 21 sets the current target input rotational speed Nin* to the preceding value of the target input rotational speed Nin* (step S228). Further, the speed change ECU 21 sets the target speed ratio γ* for the CVT 40 by dividing the set target input rotational speed Nin* by the output rotational speed Nout input in step S10 (step S240), executes hydraulic control in step S150, and executes the processing in and after step S10 again while the accelerator pedal 91 is depressed.

Also in the case where the target value setting processing in step S200 is executed after the target input rotational speed Nin* is set in step S228, the speed change ECU 21 executes the processing in steps S202, S204, and S206, and determines in step S208 whether or not the step-down flag Fsd has a value of 1. Also in this case, the step-down flag Fsd is maintained at a value of 1. Thus, the speed change ECU 21 determines in step S208 that the step-down flag Fsd has a value of 1, and determines whether or not the input rotational speed Nin generally coincides with the preceding value of the target input rotational speed Nin* (step S210). Then, in the case where it is determined in step S210 that the input rotational speed Nin of the CVT 40 does not generally coincide with the preceding value of the target input rotational speed Nin*, the speed change ECU 21 sets the current target input rotational speed Nin* to the preceding value of the target input rotational speed Nin* (step S228).

As a result, as illustrated in FIGS. 13A, 13B, 13C, and 13D, the target input rotational speed Nin* is continuously set to the value calculated in step S220 (next upshift rotational speed Ninup−ΔNkd×tint) after the target input rotational speed Nin* is set on the basis of the next upshift rotational speed Ninup, the climb gradient ΔNkd, and the shifting-to-shifting time tint in step S220 (time t20 in FIGS. 13A to 13D) until it is determined in step S210 that the input rotational speed Nin of the CVT 40 generally coincides with the preceding value of the target input rotational speed Nin* (time t21 in FIGS. 13A to 13D). Consequently, as illustrated in FIGS. 13A to 13D, the speed ratio γ can be varied stepwise to the downshift side by increasing the input rotational speed Nin of the CVT 40 relatively steeply.

In the case where it is determined in step S210 that the input rotational speed Nin of the CVT 40 generally coincides with the preceding value of the target input rotational speed Nin* after the processing in steps S202, S204, S206, and S208 are executed, meanwhile, the speed change ECU 21 sets the step-down flag Fsd to a value of 0 (step S212), and executes the determination processing in step S214 discussed above. In this case, it is not the time to start execution of a kickdown. Thus, the speed change ECU 21 does not execute the processing in and after step S216, and determines whether or not the preceding value of the target input rotational speed Nin* is less than the next upshift rotational speed Ninup set in step S206 (whether the target input rotational speed Nin* has reached the next upshift rotational speed Ninup) (step S230).

In the case where it is determined in step S230 that the preceding value of the target input rotational speed Nin* is less than the next upshift rotational speed Ninup set in step S206, the speed change ECU 21 derives and sets the climb gradient ΔNkd corresponding to the current accelerator operation amount Acc input in step S10 and the current vehicle speed range SRp set in step S204 from the kickdown climb gradient setting map discussed above (step S232) as in step S218. Then, the speed change ECU 21 sets the current target input rotational speed Nin* to the sum of the preceding value of the target input rotational speed Nin* and the climb gradient ΔNkd set in step S232 (step S234), and sets the target speed ratio γ* for the CVT 40 by dividing the set target input rotational speed Nin* by the output rotational speed Nout input in step S10 (step S240). Further, the speed change ECU 21 executes hydraulic control in step S150, and executes the processing in and after step S10 again while the accelerator pedal 91 is depressed.

Also in the case where the target value setting processing in step S200 is executed after the target input rotational speed Nin* is set in step S234, the speed change ECU 21 executes the processing in steps S202, S204, and S206, and thereafter determines in step S208 whether or not the step-down flag Fsd has a value of 1. In this case, the step-down flag Fsd is set to a value of 0 in step S212 as discussed above, and it is not the time to start execution of a kickdown. Thus, the speed change ECU 21 executes the determination processing in step S214, and thereafter determines whether or not the preceding value of the target input rotational speed Nin* is equal to or more than the next upshift rotational speed Ninup set in step S206 (step S230). In the case where it is determined in step S230 that the preceding value of the target input rotational speed Nin* is less than the next upshift rotational speed Ninup, the speed change ECU 21 sets the climb gradient ΔNkd corresponding to the current accelerator operation amount Acc and the current vehicle speed range SRp (step S232), and sets the current target input rotational speed Nin* to the sum of the preceding value of the target input rotational speed Nin* and the climb gradient ΔNkd (step S234).

As a result, as illustrated in FIGS. 13A to 13D, the target input rotational speed Nin* is set to the sum of the preceding value of the target input rotational speed Nin* and the climb gradient ΔNkd in step S234 after it is determined in step S210 that the input rotational speed Nin* of the CVT 40 generally coincides with the target input rotational speed Nin* (time t21 in FIGS. 13A to 13D) after being increased in accordance with the target input rotational speed Nin* set in step S220 until it is determined in step S230 that the preceding value of the target input rotational speed Nin* has become equal to or more than (reached) the next upshift rotational speed Ninup set in step S206 (time t22 in FIGS. 13A to 13D). Consequently, it is possible to make the input rotational speed Nin of the CVT 40 higher in accordance with the climb gradient ΔNkd which is constant and matches the current accelerator operation amount Acc and the current vehicle speed range SRp in the case where the current vehicle speed range SRp is not varied with a generally constant accelerator operation amount, and to vary the speed ratio γ stepwise to the upshift side at the time point (time t22 in FIGS. 13A to 13D) when the shifting-to-shifting time tint has elapsed since the timing (time t21 in FIGS. 13A to 13D) when the input rotational speed Nin is increased in accordance with the target input rotational speed Nin* set in step S220. Even if the accelerator operation amount Acc and the current vehicle speed range SRp (current vehicle speed V) are varied after the speed ratio γ is varied stepwise to the downshift side, meanwhile, it is possible to change the climb gradient ΔNkd so as to match the current accelerator operation amount Acc and the current vehicle speed range SRp, and to make the input rotational speed Nin accordingly higher.

Also in the case where the target value setting processing in step S200 is executed after the target input rotational speed Nin* is reset in step S226, on the other hand, the speed change ECU 21 executes the processing in steps S202, S204, and S206 discussed above, and determines in step S208 whether or not the step-down flag Fsd has a value of 1. In the case where the target input rotational speed Nin* is reset in S226, it is determined in step S222 discussed above that the target input rotational speed Nin* is equal to or less than the input rotational speed Nin, the step-down flag Fsd is set to a value of 0 in step S224, and thus the speed change ECU 21 determines in step S208 that the step-down flag Fsd has a value of 0. Then, the speed change ECU 21 executes the determination processing in step S214 instead of executing the determination processing in step S210. In this case, it is not the time to start execution of a kickdown. Thus, the speed change ECU 21 does not execute the processing in and after step S216, and determines whether or not the preceding value of the target input rotational speed Nin* is less than the next upshift rotational speed Ninup set in step S206 (whether the target input rotational speed Nin* has reached the next upshift rotational speed Ninup) (step S230).

In the case where it is determined in step S230 that the preceding value of the target input rotational speed Nin* is less than the next upshift rotational speed Ninup, the speed change ECU 21 sets the climb gradient ΔNkd corresponding to the current accelerator operation amount Acc and the current vehicle speed range SRp (step S232), and sets the current target input rotational speed Nin* to the sum of the preceding value of the target input rotational speed Nin* and the climb gradient ΔNkd (step S234). Further, the speed change ECU 21 sets the target speed ratio γ* for the CVT 40 by dividing the target input rotational speed Nin* by the output rotational speed Nout (step S240), executes hydraulic control in step S150, and executes the processing in and after step S10 again while the accelerator pedal 91 is depressed.

As a result, in the case where it is determined that the target input rotational speed Nin* set in step S220 is equal to or less than the input rotational speed Nin (step S222) and the target input rotational speed Nin* is reset to the sum of the input rotational speed Nin (current input rotational speed) and the climb gradient ΔNkd (step S226), the target input rotational speed Nin* is set such that the input rotational speed Nin is varied in accordance with the climb gradient ΔNkd (steps S226 and S234; see the broken lines in FIGS. 13A to 13D) from the timing when the speed ratio γ is varied to the downshift side in response to a kickdown operation (time t20 in FIGS. 13A to 13D) until it is determined in step S230 that the preceding value of the target input rotational speed Nin* has become equal to or more than (reached) the next upshift rotational speed Ninup set in step S206 (time t22 in FIGS. 13A to 13D). In this way, it is possible to improve the sense of directness by allowing the driver to feel that acceleration that matches his/her intention of acceleration has been obtained by setting the climb gradient ΔNkd to a relatively large value even if the target input rotational speed Nin* is set such that the input rotational speed Nin is increased in accordance with the climb gradient ΔNkd which matches the current accelerator operation amount Acc and the current vehicle speed range SRp from the timing when the speed ratio γ is varied to the downshift side in response to a kickdown operation until the target input rotational speed Nin* (preceding value) reaches the next upshift rotational speed Ninup.

In the case where it is determined in step S230 that the preceding value of the target input rotational speed Nin* is equal to or more than the next upshift rotational speed Ninup set in step S102 after the processing in steps S202, S204, S206, S208, and S214 are executed, the speed change ECU 21 sets the kickdown flag Fkd to a value of 0 in step S236 (time t22 in FIGS. 13A to 13D), and executes the processing in and after step S120 in FIG. 8. Then, the speed change ECU 21 repeatedly executes the processing in and after step S10 discussed above while the accelerator pedal 91 is depressed.

As discussed above, in executing a kickdown, the speed change ECU 21 which serves as the control device for the CVT 40 acquires, for each time interval dt determined in advance, the current vehicle speed range SRp which matches the current accelerator operation amount Acc and the current vehicle speed V, that is, one of the plurality of vehicle speed ranges SR matching the current accelerator operation amount Acc that includes the current vehicle speed V, from the plurality of vehicle speed ranges SR (vehicle speed range setting map) determined by dividing a vehicle speed settable range for each accelerator operation amount into a plurality of divisions (step S204). In addition, the speed change ECU 21 sets, on the basis of at least the current accelerator operation amount Acc, the next upshift rotational speed Ninup, which is the target value for the input rotational speed Nin to be achieved when the speed ratio γ is varied stepwise to the upshift side the next time, for each time interval dt (step S206). Further, when a kickdown operation is performed, the speed change ECU 21 sets the target input rotational speed Nin* to be higher than the input rotational speed Nin (current input rotational speed) at the time point such that the speed ratio γ is varied stepwise to the downshift side (step S220). Then, after the input rotational speed Nin is increased in accordance with the target input rotational speed Nin* set in step S220, the speed change ECU 21 acquires, for each time interval dt, the climb gradient ΔNkd which matches the current accelerator operation amount Acc and the current vehicle speed range SRp from the climb gradient ΔNkd (kickdown gradient setting map) of the input rotational speed Nin determined for each of the plurality of vehicle speed ranges SR for each accelerator operation amount (step S232), and sets, for each time interval dt, the target input rotational speed Nin* such that the input rotational speed Nin is varied in accordance with the climb gradient ΔNkd which matches the current accelerator operation amount Acc and the current vehicle speed range SRp until the target input rotational speed Nin* (preceding value) reaches the next upshift rotational speed Ninup (step S234).

That is, the speed change ECU 21 varies the speed ratio γ stepwise to the downshift side by increasing the input rotational speed Nin in response to a kickdown operation, and thereafter sets the target input rotational speed Nin* such that the input rotational speed Nin is increased in accordance with the climb gradient ΔNkd which matches the current accelerator operation amount Acc and the current vehicle speed range SRp. Consequently, it is possible to make the input rotational speed Nin higher in accordance with the climb gradient ΔNkd which is constant and matches the current accelerator operation amount Acc and the current vehicle speed range SRp in the case where the current vehicle speed range SRp is not varied with a generally constant accelerator operation amount after a kickdown operation is performed. Even if the accelerator operation amount or the current vehicle speed range SRp (vehicle speed) is varied after a kickdown operation is performed, meanwhile, it is possible to change the climb gradient ΔNkd so as to match the current accelerator operation amount Acc and the current vehicle speed range SRp, and to make the input rotational speed Nin accordingly higher. As a result, it is possible to improve the sense of directness by allowing the driver to feel that acceleration that matches his/her intention of acceleration has been obtained after a kickdown operation is performed. Thus, it is possible to improve the acceleration feel and the drivability of the automobile 10 on which the CVT 40 is mounted.

Further, the speed change ECU 21 acquires the shifting-to-shifting time tint which matches the current accelerator operation amount Acc and the current vehicle speed range SRp from a plurality of shifting-to-shifting times tint (shifting-to-shifting time setting map) determined for each of the plurality of vehicle speed ranges SR for each accelerator operation amount as the time from the timing when the input rotational speed Nin is increased in accordance with the target input rotational speed Nin* set in step S220 until the speed ratio γ is varied stepwise to the upshift side the next time (step S218). Then, when a kickdown operation is performed, the speed change ECU 21 sets the target input rotational speed Nin* on the basis of the next upshift rotational speed Ninup set in step S206 and the climb gradient ΔNkd and the shifting-to-shifting time tint acquired in step S218 (step S220). Consequently, it is possible to increase, at the timing when the speed ratio γ is varied stepwise to the downshift side in response to a kickdown operation, the input rotational speed Nin by an amount matching the climb gradient ΔNin, which is used to make the input rotational speed Nin higher thereafter, to vary the speed ratio γ stepwise to the upshift side the next time at a more adequate timing that matches the intention of acceleration of the driver.

In addition, in the case where the target input rotational speed Nin* set in step S220 on the basis of the next upshift rotational speed Ninup, the climb gradient ΔNkd, and the shifting-to-shifting time tint is equal to or less than the input rotational speed Nin (current input rotational speed), the speed change ECU 21 resets the target input rotational speed Nin* on the basis of the input rotational speed Nin and the climb gradient ΔNkd (step S226). Further, in the case where it is determined that the target input rotational speed Nin* set in step S220 is equal to or less than the input rotational speed Nin, the speed change ECU 21 sets the target input rotational speed Nin* such that the input rotational speed Nin is varied in accordance with the climb gradient ΔNkd from the timing when the speed ratio γ is varied to the downshift side in response to a kickdown operation until the target input rotational speed Nin* (preceding value) reaches the next upshift rotational speed Ninup (steps S226 and S234).

Consequently, it is possible to reliably suppress a phenomenon that the speed ratio γ of the CVT 40 is not varied to the downshift side when a kickdown operation is performed, and to improve the sense of directness by allowing the driver to feel that acceleration that matches his/her intention of acceleration has been obtained after a kickdown operation is performed by setting the climb gradient ΔNkd to a relatively large value. Thus, depending on the vehicle on which the CVT 40 is mounted, the climb gradient ΔNkd may be set to a sufficiently large value to omit the processing in steps S216 to S228 etc., and the target input rotational speed Nin* may be set such that the input rotational speed Nin is varied in accordance with the climb gradient ΔNkd from the timing when the speed ratio γ is varied to the downshift side in response to a kickdown operation until the target input rotational speed Nin* reaches the next upshift rotational speed Ninup.

In the embodiment, further, the shifting-to-shifting time tint is determined to become shorter as the accelerator operation amount becomes larger, and to become longer as the vehicle speed range SR transitions toward the high speed side excluding a case where the current vehicle speed range SRp is the lowest vehicle speed range SR1. In this way, by making the shifting-to-shifting time tint, that is, the interval after a kickdown operation is performed until the speed ratio is varied stepwise to the upshift side the next time, shorter as the accelerator operation amount becomes larger, an atmospheric acceleration feel, that is, a sense of rhythm, to be felt by the driver can be improved in the case where the intention of acceleration of the driver is high. Then, by making the shifting-to-shifting time tint longer as the vehicle speed range SR transitions toward the high speed side excluding a case where the current vehicle speed range SRp is the lowest vehicle speed range SR1, it is possible to suppress impairment of the sense of rhythm, and hence occurrence of the sense of busyness, by suppressing frequent fluctuations in engine sound of the automobile 10 or the like in the case where the intention of acceleration of the driver is low.

In the embodiment, in addition, the climb gradient ΔNkd acquired from the kickdown gradient setting map is larger than the climb gradient ΔNin corresponding to the same (combination of) accelerator operation amount and vehicle speed range SR acquired from the climb gradient setting map used at the time of execution of a stepped upshift. Consequently, it is possible to improve the sense of directness and the sense of rhythm during a period after a kickdown operation is performed until the speed ratio γ is varied stepwise to the upshift side the next time.

As has been described above, the speed change ECU 21 according to the second embodiment steplessly changes the speed ratio γ of the CVT 40, and executes a stepwise change of the speed ratio γ, that is, a stepwise upshift. In the case where the accelerator operation amount Acc is constant, the number of change steps of the speed ratio γ which corresponds to the number of shift speeds of a stepped transmission, that is, the number of allowable stepwise upshifts, is larger as the accelerator operation amount Acc is larger. In this way, the vehicle acceleration G and the engine sound of the automobile 10 can be adequately varied in accordance with the intention of acceleration of the driver by increasing the number of allowable stepwise upshifts as the accelerator operation amount Acc, that is, the accelerator depression amount achieved by the driver, is larger in the case where the accelerator operation amount Acc is constant. Thus, the drivability of the automobile 10 can be improved significantly favorably by achieving both the sense of directness and the sense of rhythm.

In the second embodiment, the speed change ECU 21 which executes the routine of FIG. 7 corresponds to the "control device for a continuously variable transmission", and the speed change ECU 21 which executes the processing in steps S10 to S40 of FIG. 7, S70 (routine of FIG. 8) to S100, and S150 corresponds to the "controller". Also in the second embodiment, in addition, the CVT 40 is not limited to the continuously variable transmission of a belt type, and may also be a mechanical continuously variable transmission such as a continuously variable transmission of a toroidal type and a continuously variable transmission of a cone type, for example. Alternatively, the CVT 40 may be an electric continuously variable transmission that includes at least one electric motor (motor generator), or an electric continuously variable transmission that includes a planetary gear and two electric motors (motor generators). In such a case, the rotational speed of the engine or the like may be used in place of the input rotational speed Nin, and a target engine rotational speed may be used in place of the target input rotational speed Nin*. Then, the operation amount of the throttle valve 13 may be used in place of the accelerator operation amount Acc as a parameter used to change the speed ratio γ of the CVT 40 stepwise.

It should be noted, however, that the present disclosure is not limited to the embodiments described above in any way, and it is a matter of course that the present disclosure may be modified in various ways without departing from the scope of the present disclosure. Further, the mode for carrying out the present disclosure described above is merely a specific form of the disclosure described in the "SUMMARY" section, and does not limit the elements of the disclosure described in the "SUMMARY" section.

INDUSTRIAL APPLICABILITY

The present disclosure can be utilized in the continuously variable transmission manufacturing industry etc.

The invention claimed is:
1. A control device for a continuously variable transmission that steplessly changes a speed ratio of the continuously variable transmission mounted on a vehicle, the control device comprising:
   a controller that changes the speed ratio such that a stepwise upshift is performed, wherein
   in the case where an accelerator depression amount is constant, the controller sets the speed ratio such that a number of allowable stepwise upshifts increases as the accelerator depression amount is larger, compared to when the accelerator depression amount is small.
2. The control device according to claim 1, wherein
   the controller changes the speed ratio such that a shifting interval time, which is a time between stepwise upshifts, is made shorter and a rate of variation in vehicle acceleration during the shifting interval time has a larger value as the accelerator depression amount is larger.
3. The control device according to claim 1, wherein
   the controller changes the speed ratio such that a shifting interval time, which is a time between stepwise upshifts, is made longer and a rate of variation in vehicle acceleration during the shifting interval time has a smaller value as a vehicle speed of the vehicle is higher.

4. The control device according to claim 1, wherein
the controller changes the speed ratio such that an amount of variation in vehicle acceleration between before and after the stepwise upshift is smaller as a vehicle speed of the vehicle is higher.

5. The control device according to claim 1, wherein
the controller makes a shifting-to-shifting time, which is a time between stepwise upshifts, longer as a number of executions of the stepwise upshift is increased when the vehicle is accelerating.

6. The control device according to claim 1, wherein
the controller makes a shifting-to-shifting time, which is a time between stepwise upshifts, shorter as the accelerator depression amount is larger.

7. The control device according to claim 5, wherein
the controller changes the speed ratio such that a shifting interval time, which is the time between the stepwise upshifts, is made shorter and a rate of variation in vehicle acceleration during the shifting interval time has a larger value as the accelerator depression amount is larger.

8. The control device according to claim 6, wherein
the controller changes the speed ratio such that a shifting interval time, which is the time between the stepwise upshifts, is made shorter and a rate of variation in vehicle acceleration during the shifting interval time has a larger value as the accelerator depression amount is larger.

9. The control device according to claim 6, wherein
the controller changes the speed ratio such that a shifting interval time, which is the time between the stepwise upshifts, is made longer and a rate of variation in vehicle acceleration during the shifting interval time has a smaller value as a vehicle speed of the vehicle is higher.

10. The control device according to claim 6, wherein
the controller makes the shifting-to-shifting time, which is the time between the stepwise upshifts, longer as a number of executions of the stepwise upshift is increased when the vehicle is accelerating.

11. The control device according to claim 10, wherein
the controller changes the speed ratio such that a shifting interval time, which is the time between the stepwise upshifts, is made longer and a rate of variation in vehicle acceleration during the shifting interval time has a smaller value as a vehicle speed of the vehicle is higher.

12. The control device according to claim 10, wherein
the controller changes the speed ratio such that a shifting interval time, which is the time between the stepwise upshifts, is made shorter and a rate of variation in vehicle acceleration during the shifting interval time has a larger value as the accelerator depression amount is larger.

13. The control device according to claim 12, wherein
the controller changes the speed ratio such that the shifting interval time, which is the time between the stepwise upshifts, is made longer and the rate of variation in vehicle acceleration during the shifting interval time has a smaller value as a vehicle speed of the vehicle is higher.

14. The control device according to claim 13, wherein
the controller changes the speed ratio such that an amount of variation in vehicle acceleration between before and after the stepwise upshift is smaller as the vehicle speed of the vehicle is higher.

15. The control device according to claim 14, wherein
the controller changes the speed ratio such that the amount of variation in vehicle acceleration between before and after the stepwise upshift is larger as the accelerator depression amount is larger and the vehicle speed of the vehicle is lower.

16. The control device according to claim 15, wherein
the number of allowable stepwise upshifts at a time when the accelerator depression amount is maximum is determined to be a value within a range of 12 steps to 48 steps.

17. The control device according to claim 16, wherein
the number of allowable stepwise upshifts during a period during which the vehicle speed is increased from zero to a maximum vehicle speed at the time when the accelerator depression amount is maximum is determined on the basis of a time that allows humans to perceive variations in vehicle acceleration and the time during which the vehicle speed is increased from zero to the maximum vehicle speed.

18. The control device according to claim 17, further comprising:
a mode select switch that allows a driver to select one of a continuously variable speed change mode, in which the speed ratio is changed steplessly, and a stepped speed change mode, in which the speed ratio is changed stepwise, wherein
the speed ratio is changed such that the stepwise upshift is performed when the stepped speed change mode is selected by the driver.

19. A control device for a continuously variable transmission that steplessly changes a speed ratio of the continuously variable transmission mounted on a vehicle, the control device comprising:
a controller that changes the speed ratio such that a stepwise upshift is performed, wherein
the controller sets a shifting-to-shifting time, which is a time between stepwise upshifts, shorter as an accelerator depression amount is larger and setting the speed ratio based on the shifting-to-shifting time.

20. A control device for a continuously variable transmission that steplessly changes a speed ratio of the continuously variable transmission mounted on a vehicle, the controller comprising:
a controller that changes the speed ratio such that a stepwise upshift is performed, wherein
the controller sets a shifting-to-shifting time, which is a time between stepwise upshifts, longer as the stepwise upshifts are repeatedly performed when the vehicle is accelerating and setting the speed ratio based on the shifting-to-shifting time.

* * * * *